United States Patent [19]

Mashiko

[11] Patent Number: 5,396,581
[45] Date of Patent: Mar. 7, 1995

[54] SEMICONDUCTOR NEURAL NETWORK AND OPERATING METHOD THEREOF

[75] Inventor: Koichiro Mashiko, Hyogo, Japan

[73] Assignee: Mitsubishi Denki Kabushiki Kaisha, Tokyo, Japan

[21] Appl. No.: 5,454

[22] Filed: Jan. 19, 1993

Related U.S. Application Data

[62] Division of Ser. No. 605,717, Oct. 30, 1990, Pat. No. 5,202,956.

[30] Foreign Application Priority Data

Dec. 16, 1989 [JP] Japan .................. 1-326258
Apr. 28, 1990 [JP] Japan .................. 2-113055

[51] Int. Cl.⁶ .................. G06F 15/18; G06G 7/60
[52] U.S. Cl. .................. 395/24
[58] Field of Search .................. 395/24, 27, 23

[56] References Cited

U.S. PATENT DOCUMENTS

| | | | |
|---|---|---|---|
| 4,660,166 | 4/1987 | Hopfield | 364/807 |
| 4,807,168 | 2/1989 | Moopenn et al. | 364/602 |
| 4,901,271 | 2/1990 | Graf | 364/807 |
| 4,982,370 | 1/1991 | Matsumoto et al. | 365/222 |
| 4,988,891 | 1/1991 | Mashiko | 307/201 |
| 5,004,932 | 6/1991 | Nejime | 307/201 |
| 5,021,988 | 6/1991 | Mashiko | 364/807 |
| 5,053,638 | 10/1991 | Furutani et al. | 307/201 |
| 5,101,361 | 3/1992 | Eberhardt | 395/24 |
| 5,146,542 | 9/1992 | Engeler | 395/24 |

OTHER PUBLICATIONS

DeGloria, "The VLSI Technology and the Design of Neural Networks", First Italian Workshop Parallel Architectures and Neural Networks, App. 1988, pp. 119–127.

Mead et al, "Analog VLSI Implementation of Neural Systems", Kluwer Academic Pub., 1989, pp. 135–169.

Schwartz et al, "A Programmable Analog Neural Network Chip," IEEE Jour. Solid State Circuits, Apr. 1989, pp. 688–697.

(List continued on next page.)

*Primary Examiner*—Robert W. Downs
*Attorney, Agent, or Firm*—Lowe, Price, LeBlanc & Becker

[57] ABSTRACT

A semiconductor neural network includes a coupling matrix having coupling elements arranged in a matrix which couple with specific coupling strengths internal data input lines to internal data output lines. The internal data output lines are divided into groups. The neural network further comprises weighting addition circuits provided corresponding to the groups of the internal data output lines. A weighting addition circuit includes weighing elements for adding weights to signals on the internal data output lines in the corresponding group and outputting the weighted signals, and an addition circuit for outputting a total sum of the outputs of those weighting elements. The internal data output lines are arranged to form pairs and the addition circuit has a first input terminal for receiving one weighting element output of each of the pairs in common, a second input terminal for receiving the other weighting element output of each of the pairs in common, and a sense amplifier for differentially amplifying signals at the first and second input terminals. The neural network further includes a circuit for detecting a change time of an input signal, a circuit responsive to an input signal change for equalizing the first and second input terminals for a predetermined period, and a circuit for activating the sense amplifier after the equalization is completed. The information retention capability of each coupling element is set according to the weight of an associated weighting element. This neural network can provide multi-valued expression of coupling strength with less number of coupling elements.

5 Claims, 12 Drawing Sheets

OTHER PUBLICATIONS

Treleaven et al., "VLSI Architectures for Neural Networks," IEEE Micro, Dec. 1989, pp. 8–27.

Rossetto et al., "Analog VLSI Synoptic Matrices," IEEE Micro, Dec. 1989, pp. 56–63.

Alspector et al, "Performance of a Stochastic Learning Microchip", Advances in Neural Information Processing Systems I, 1989, pp. 748–760.

Graf et al, "Analog Electronic Neural Network Circuits," IEEE Circuit and Devices Mag., Jul. 1989, pp. 44–55.

Graf et al, "VLSI Implementation of a Neural Network Model," Computer, Mar. 1988, pp. 41–49.

Alspector et al, "A Neuromorphic VLSI Learning System," Advanced Research in VLSI, 1987, pp. 313–349.

Graf, "A CMOS Associative Memory Chip Based on Neural Network," 87 ISSCC, Digest of Technical Papers, Feb. 1987, pp. 304–305.

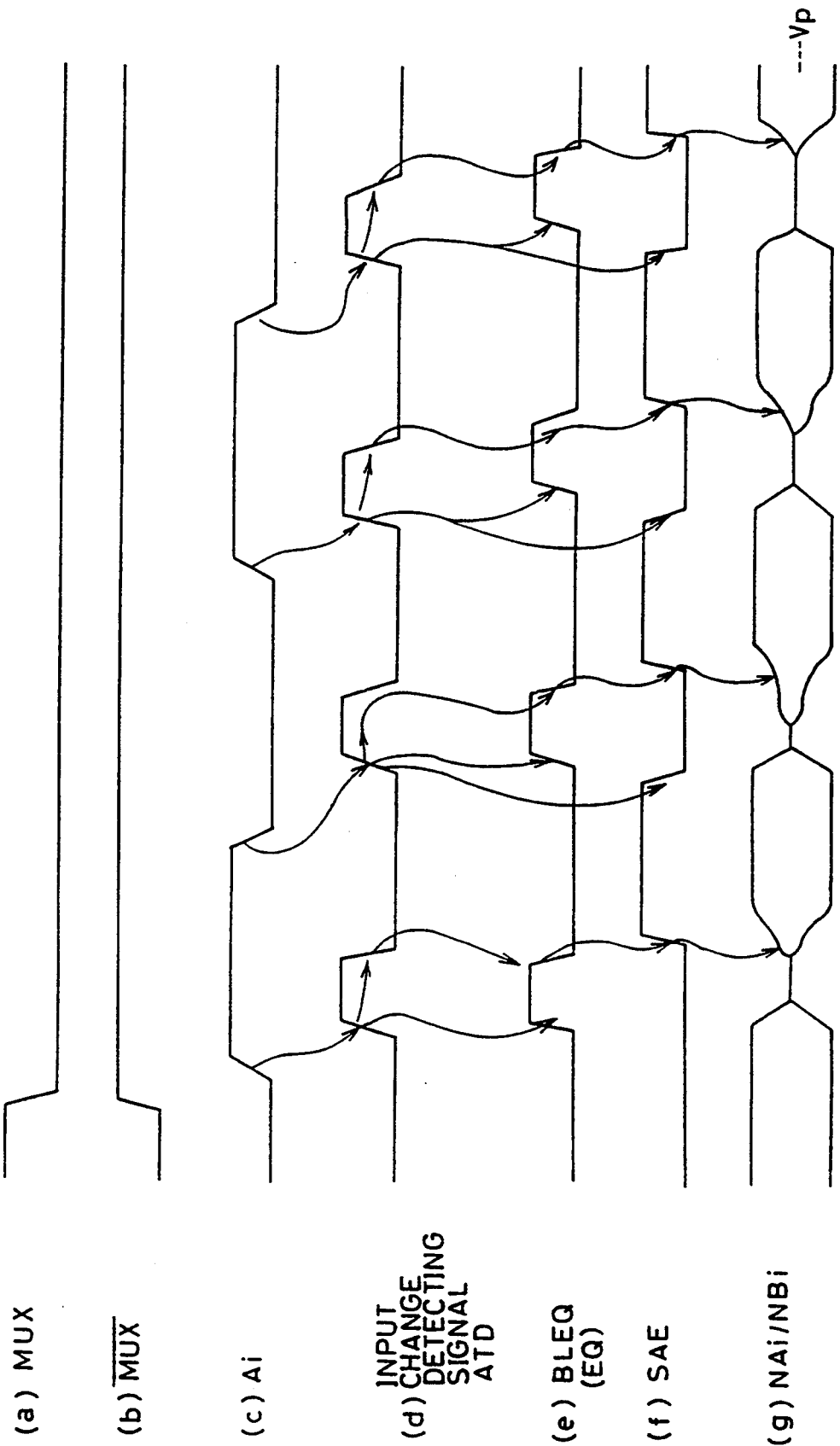

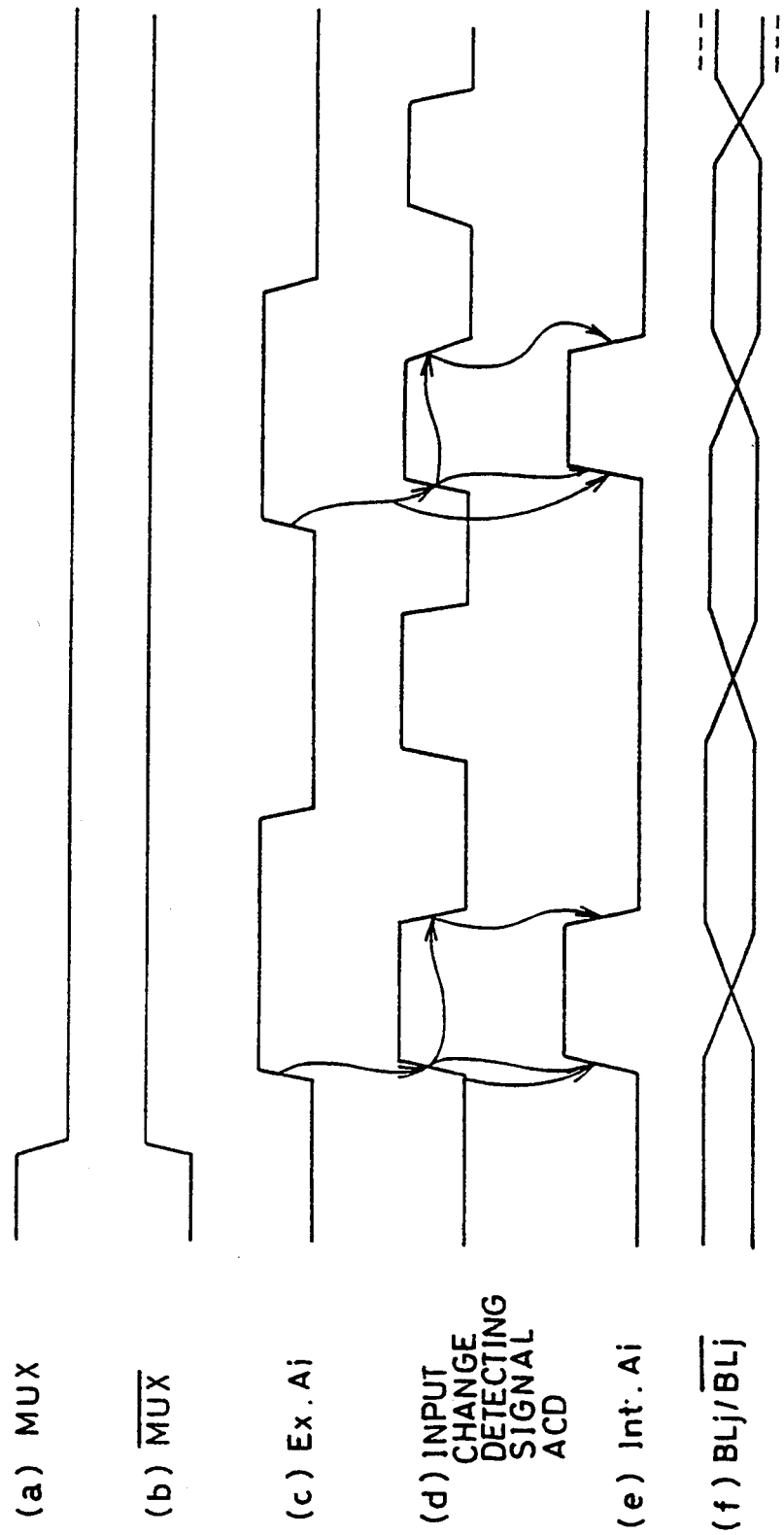

SEMICONDUCTOR NEURAL NETWORK AND OPERATING METHOD THEREOF

This application is a Divisional application of application Ser. No. 07/605,717, filed Oct. 30, 1990, issued as U.S. Pat. No. 5,202,956.

BACKGROUND OF THE INVENTION

1. Field of the Invention

The present invention generally relates to semiconductor neural networks, and more particularly, to a simple structure of coupling matrix which can give substantially multi-valued expression to coupling strength of each coupling element in the coupling matrix.

2. Description of Background Art

In recent years, a variety of circuits modeled on a neuron of a human being has been contrived. Among such neuron models, there is one called a Hopfield's model. This Hopfield's model will be briefly described below.

In FIG. 1, there is shown a schematic structure of a unit modeled on a neuron. A unit i comprises an input portion A for receiving signals from other units k, j, l and the like, a converting portion B for converting applied inputs according to a certain rule, and an output portion C for outputting the conversion results.

The input portion A has a weight (synapse load) W for each input unit which indicates a coupling strength between the units. For example, a signal Sk from the unit k is loaded with a weight Wik before transmitted to the converting portion B. This weight W can take any of positive and negative values or 0.

The converting portion B make a total sum "net" of inputs S that have been loaded with the weights W undergo a predetermined function f for output. Therefore, output Si from the unit i at the time t is given as:

$$Ui(t) = \text{net}(i) = \sum_j Wij \cdot Sj$$

$$Si = f[Ui(t)].$$

As the function f, a threshold function shown in FIG. 2A or a sigmoid function shown in FIG. 2B is often used.

The threshold function shown in FIG. 2A is a unit step function having characteristics that when the total sum "net (i)" of inputs becomes larger than a threshold value ($\theta$), logical "1" is outputted, and when it does not reach the threshold value, logical "0" is outputted.

The sigmoid function shown in FIG. 2B is a non-linear monotonously increasing function and given by the following expression:

$$f = 1/[1 + \exp(-\text{net}(i))].$$

The range of values of the sigmoid function is from 0 to 1. Therefore, as the total sum "net (i)" of inputs becomes smaller, the output approaches to "0", and as the total sum "net (i)" of inputs becomes larger, the output approaches to "1". When the total sum "net (i)" of inputs is "0", this sigmoid function outputs "0.5".

Another function obtained by adding a threshold value $\theta$ to the above-mentioned sigmoid function, as given by the following expression, may be employed.

$$f = 1/[1 + \exp(-\text{net}(i) + \theta)]$$

The neuron unit shown in FIG. 1 is modeled on a vital cell which receives stimuli from other neurons and fires when a total sum of the stimuli exceeds a certain value. The Hopfield's model provides an operational model to a network configured of a plurality of such neuron units.

In the expressions above, when one neuron is initialized, the state of all the following neuron units is determined in principal by applying the above-mentioned two dynamic equations to each neuron unit and solving them simultaneously.

When the number of units increases, however, it is almost impossible to investigate and catch hold of state of one unit after another, and to program weights and bias values such that an optimal solution can be provided for a target problem. Therefore, Hopfield has introduced, in place of state of each unit, an energy function E as a quantity for representing entire characteristics of a neural net, which is defined as follows.

$$E = -(1/2) \sum_{i,j} Wij \cdot Si \cdot Sj - \sum_i Ii \cdot Si$$

In the expression above, Ii is a self-bias value specific to the unit i.

Hopfield has demonstrated that when the weight (synapse load) Wij has a symmetry shown as Wij=Wji, each unit changes its own state such that the above-mentioned energy function E always takes minimum values (more correctly, local minima), and proposed this model be applied to programming of the weight Wij. A model according to the energy function E as described above is called a Hopfield's model.

The expressions above are often restated for a discrete model as:

$$Ui(n) = \sum_j Wij \cdot Sj(n) + Ii,$$

$$Si(N + 1) = f[Ui(n)].$$

In the expression above, n is a discrete time. Hopfield himself has demonstrated that the Hopfield's model above can work with good accuracy especially when the function f indicating input/output characteristics has a steep gradient (which is approximate to a unit step function in which most of the outputs take values close to either "0" or "1").

Neural networks have been configured according to this Hopfield's model in VLSI (Very Large Scale Integration) technology. One example of such a neural network is disclosed in "Computer" March, 1988, pp. 41 to 49, published by IEEE (Institute of Electrical and Electronics Engineers).

In FIG. 3, there is shown the entire schematic structure of a conventional integrated neural network circuit, which is disclosed by H. P. Graf in the article titled "A CMOS Associative Memory Chip Based on Neural Network", ISSCC 87, Digest of Technical Papers, 1987 February, pp. 304 and 305. Referring to FIG. 3, the conventional integrated neural network circuit comprises a resistive matrix 100 having resistive coupling elements with predetermined weights arranged in a matrix, and an amplifying circuit 101 for amplifying potentials on data input lines (not shown) included in the resistive matrix 100 and feeding back those amplified signals to input portions of the resistive coupling elements. The resistive matrix 100 comprises the data input lines and data output lines arranged in a direction orthogonally intersecting the data input lines, as will be described in detail data. Interconnections between the data input lines and the data output lines made through the resistive coupling elements are programmable.

To program state of each resistive coupling element (or interconnection state between a data input line and a data output line) contained in the resistive matrix 100, there are provided a row decoder 102 and a bit decoder 103. The row decoder 102 selects one row of coupling elements in the resistive matrix 100. The bit decoder 103 selects one column of coupling elements in the resistive matrix 100.

For data input/output, there are provided an input/output data register 104 for temporarily latching input/output data, a multiplexer 105 for connecting the input/output data register 104, according to write/read mode of the data, to either the data input lines or the data output lines in the resistive matrix 100, an interface (I/O) 106 for connecting the input/output data register 104 to the outside of the device. This neural network is integrated on a semiconductor chip 200. In FIG. 4, there is shown a structure of the resistive matrix 100 in FIG. 3, which is disclosed in the above mentioned ISSCC article by H. P. Graf.

Referring to FIG. 4, the resistive matrix 100 comprises data input lines A1 to A4 and data output lines B1 and $\overline{B1}$, B2 and $\overline{B2}$, B3 and $\overline{B3}$, and B4 and $\overline{B4}$. At the connections between the data input lines A1 to A4 and the data output lines $\overline{B1}$ and B1 to $\overline{B4}$ and B4, there are provided resistive coupling elements 1 each for coupling a data input line to a corresponding data output line. Each coupling element 1 can take three states; open or don't care state, excitatory state and inhibitory state. The state of each resistive coupling element 1 can be externally programmed according to an applied problem. Though in FIG. 3, those resistive coupling elements 1 that are in the open state are not shown, all the connections between the data input lines and the data output lines are provided with the resistive coupling elements 1. Each resistive coupling element 1 transmits, according to its own programmed state, potential level on the corresponding data output line onto the corresponding data input line.

For the input lines A1 to A4, there are provided inverting amplifiers 2-1 to 2-8 for amplifying data signals on the corresponding data input lines and transmitting the amplified signals to the corresponding data output lines. Two series-connected inverting amplifiers serve as a single amplifier unit Ci (i=1 to 4) for a single data input line Ai (i=1 to 4).

The inverting amplifier 2-1 inverts potential on the input line A1 and transmits the inverted potential onto the output line B1. The inverting amplifier 2-2 amplifies the potential on the input line A1 and transmits the amplified potential onto the output line $\overline{B1}$. The inverting amplifier 2-3 inverts signal potential on the input line A2 and transmits the inverted potential onto the output line $\overline{B2}$, and the inverting amplifier 2-4 transmits the signal potential on the data input line A2 onto the output line B2. The inverting amplifiers 2-5 and 2-6 transmit signal potential on the data input line A3 onto the data output lines B3 and $\overline{B3}$ in the inverted and non-inverted states, respectively. The inverting amplifiers 2-7 and 2-8 transmits signal potential on the data input line A4 onto the data output lines B4 and $\overline{B4}$ in the inverted and non-inverted states, respectively.

Each coupling element couples a data output line to a data input line with a specific coupling strength. In other words, this means that output of one amplifier is connected to input of another amplifier. An example of structure of the coupling element 1 is shown in FIG. 5, which is also disclosed in the above-mentioned ISSCC article by H. P. Graf.

Referring to FIG. 5, the resistive coupling element 1 comprises resistive elements R+ and R−, switching elements S1, S2, S3 and S4, and random access memory cells 150 and 151. The resistive element R+ and has one terminal connected to a supply potential $V_{DD}$. The resistive element R− has one terminal connected to another supply potential $V_{SS}$. The switching element S1 is controlled by output of an inverting amplifier 2b for its on/off. The switching element S2 is turned on/off according to information stored in the random access memory cell 150. The switching element S3 is set in the on/off state according to information stored in the random access memory cell 151. The switching element S4 is controlled by output of another inverting amplifier 2a for its on/off. The random access memory cells 150 and 151 can be externally programmed for their output states (storage information) in advance and, therefore, also the switching elements S2 and S3 can be previously programmed for their on/off.

In the structure shown in FIG. 5, an amplifying circuit Cj (a circuit constituted of the inverting amplifiers 2a and 2b) only controls with output the switching elements S1 and S4 for their on/off and does not directly supply current to a corresponding data input line Ai, thereby reducing output load capacitance of its own. The resistive elements R+ and R− are current limiting resistors.

The coupling element 1 can take three states according to programmed states (or storage information) of the random access memory cells 150 and 151. That is, an excitatory coupling state where the switching element S2 is in on the state (active state), an inhibitory coupling atate where the switching element S3 is in the on state (active state), and an open coupling state where both switching elements S2 and S3 are in the off state (non-active state). When potential levels on output lines Bj and $\overline{Bj}$ of the amplifying circuit Cj coincide with a programmed coupling state of a certain resistive coupling element 1, current flows through a corresponding data input line Ai either from the supply potential $V_{DD}$ or from the other supply potential (for example, ground potential) $V_{SS}$. When the programmed coupling state of the resistive coupling element 1 is open, no current flows through the input line Ai irrespective of output state of the amplifying circuit Cj.

When the above-mentioned circuit model is compared with a neuron model, the amplifying circuit corresponds to a neuron body (the converting portion in FIG. 1). The input lines A1 to A4 and the output lines B1 to B4 and $\overline{B1}$ to $\overline{B4}$ correspond to the data input/output line structure (dendrite and axon) shown in FIG. 1. The resistive coupling element 1 corresponds to a synapse loading portion which provides weighting between neurons. Subsequently, operation of the resistive matrix will be briefly described.

The model shown in FIG. 4 is often called a connectionists' model. In this model, each neuron unit (amplifying circuit) simply performs thresholding of an input signal (or output a signal corresponding to magnitude of the input signal with respect to a predetermined threshold value). Each resistive coupling element 1 couples output of one amplifying circuit to input of another amplifying circuit. Therefore, output state of each amplifying circuit Cj is determined by output states of all the remaining amplifying circuits Ci (i≠j). When a certain amplifying circuit Cj detects current on the corresponding input line Aj, output of the amplifying circuit Cj at that time is given as:

$$Vout(j) = f\left(\sum_i Ii\right) = f\left(\sum_i (Vout(i) - Vin(j))Wij\right)$$

In the expression above, Vin (i) and Vout (i) represent input and output voltages, respectively, of the amplifying circuit Ci connected to a data input line Ai, Ii represents current flowing through a single resistive coupling element 1, Wij represents conductance of a resistive coupling element which couples the amplifying circuit Ci connected to the data input line Ai to the amplifying circuit Cj connected to the data input line Aj.

The output voltage Vout of each amplifying circuit C is determined by transfer characteristics of the amplifying circuit C itself. The amplifying circuit C per se does not supply current to the data input line A but simply controls the switching elements S1 and S4 for their on/off operation. Accordingly, the output load of the amplifying circuit C is reduced to the capacitance of data output lines, ensuring fast operability. A voltage on an input line Ai corresponding to a certain amplifying circuit Ci is given by a total sum of currents flowing into the input line Ai. This voltage is adjusted such that the total current flowing in this network becomes 0. In such state, the total energy of the neural network reaches local minima.

Each of the amplifying circuits C is constituted of, for example, a CMOS inverter which has a high input impedance and input/output characteristics given by a non-linear monotonously increasing threshold function as described above. In this case, the following relational expression can be obtained from the above-described condition that the total current becomes 0.

$$\sum_{i,j} \Delta Iij = \sum_{i,j} \Delta Vij/Rij = 0$$

In the expression above, Iij represents current flowing through the resistors of a resistive coupling element controlled by output of the amplifying circuit Ci connected to the input line Ai. ΔVij is a potential difference at the resistive coupling element and given by:

$$\Delta Vij = Vin(j) - V_{DD} \ldots \text{excitatory coupling}$$
$$= Vin(j) - V_{SS} \ldots \text{inhibitory coupling}$$

Rij represents resistance at the resistive coupling element and is given by R+ or R−. Therefore, the voltage Vin (j) is a total sum of all the contributions of the amplifying circuits connected to the data input line Aj.

The amplifying circuits C serve as threshold elements with high gains. The threshold value of an amplifying circuit C is often set to about ½ of sum of the supply potentials $V_{SS}$ and $V_{DD}$.

The above-mentioned operation is analogical computation. This analogical computation is performed at a time in parallel in the resistive matrix 100. However, both input data signals and output data signals are digital data. Subsequently, a practical computing operation will be described with reference to FIG. 4.

Input data is applied to the respective input lines A1 to A4 through a register 10. The respective input lines A1 to A4 are charged to voltage levels corresponding to the input data and thus the neural network is initialized. Output potentials of the amplifying circuits C1 to C4 change according to charging potentials applied to the data input lines A1 to A4. These potential changes on the data output lines are fed back to the input lines A1 to A4 through the corresponding resistive coupling elements. The potential levels fed back to the data input lines A1 to A4 are defined by the programmed states of the respective resistive coupling elements 1. More specifically, when a resistive coupling element 1 has been programmed to be in the excitatory state, current flows from the supply potential VDD to a data input line Ai. On the other hand, when the resistive coupling element 1 has been programmed to be in the inhibitory state, current flows from the supply potential $V_{SS}$ to the data input line Ai. Such operations proceed in parallel except for those resistive coupling elements that have been set in the open state. Thus, currents flowing into the data input line Ai are analogically added together, causing a potential change on the data input line Ai. When the potential change on the data input line Ai goes beyond a threshold voltage of the corresponding amplifying circuit Ci, output potential of this amplifying circuit Ci changes.

By repeating such operation, output potential of each amplifying circuit C changes to meet the above-mentioned condition that the total sum of currents becomes 0, until the network settles in a state satisfying the above-described expression of the stable state. When this network has been stabilized, output voltages of the amplifying circuits C1 to C4 are stored in an output register and then read out.

A determination as to whether the network has been stabilized or not is made depending on whether or not a predetermined time has passed since the data input, or alternatively, it is determined that the network has been stabilized when, as a result of direct comparison between output data stored in the output register and different from each other in terms of time, a difference between the output data is smaller than a predetermined value.

As will be apparent from the description above, this neural network outputs such output data as allowing energy of the neural network to settle in minimum values (or local minima). Thus, according to the programmed states of the resistive coupling elements 1, the resistive matrix 100 stores some patterns or data and can determine match/mismatch between input data and the stored pattern or data. Therefore, such a neural network can also serve as an associative memory circuit or a pattern discriminator.

A structure obtained by removing the feedback paths between the data output lines land the data input lines in the resistive matrix 100 shown in FIG. 4 has been known as a perception circuit of a single layer. This perception circuit can operate in a simplified learning algorithm, arid when multi-layered, it can configure a flexible system.

Further, it has been known that if the energy function in the Hopfield's model is regarded as a probability variable and the Hopfield's algorithm is expanded to a probability system, a Boltzmann's model (Boltzmann's machine) can be obtained. In FIG. 6, there is shown a structure of the major portion of a semiconductor neural network according to the Boltzmann's model. The structure shown in FIG. 6 is disclosed, for example, in "A Neuromorphic VLSI Learning System" pp. 213 to 237 in a Journal "Advanced Research in VLSI, 1987" published by MIT Press.

In FIG. 6, neuron units are constituted of differential amplifiers Z1 to Zj each having two complementary outputs S and $\overline{S}$. When a neuron is in the "on" state, the output S represents "1" (5 V), and when the neuron is in the "off" state, the output S represents "0" (0 V). Output of a neuron unit (differential amplifier) is fed back to differential inputs IN and $\overline{IN}$ through resistive elements R. The resistive elements R have modifiable conductances which define a weight Wij.

To apply a self-bias value $-\theta$ to the respective input lines IN and $\overline{IN}$, there is provided a self-bias portion 400. This self-bias portion 400 constantly receives complementary data of "1" and "0" through a differential amplifier Zt. When corresponded to a vital neuron, each of the differential amplifiers Z1 to Zj arranged on the diagonal corresponds to a cellular body and performs threshold processing. The input lines IN and $\overline{IN}$ correspond to dendrite for receiving signals from other neurons. Each of the data input lines iN and $\overline{IN}$ can transmit both excitatory and inhibitory signals. The output lines S and $\overline{S}$ correspond to axon through which a signal from one neuron is transmitted to another. The resistive elements R correspond to synapse and their resistance values represent a coupling capacitance (synapse load) between neurons.

Resistive elements R arranged at connections of data input lines IN and $\overline{IN}$ and data output lines S and $\overline{S}$, or at a location of i row and j column, (i, j), can couple outputs of a neuron (differential amplifier) Zj to inputs of another neuron (differential amplifier) Zi and thus provides a positive weight Wij. In the case of this positive weight Wij, the output line Sj is connected to the input line INi and the complementary output line $\overline{S}j$ is connected to the complementary data input line $\overline{IN}i$. In the case of a negative weight Wij, the complementary data output line $\overline{S}j$ is connected to the data input line INi and the data input line Sj is connected to the complementary data input line $\overline{IN}i$.

Initialization of this neuron network is performed by setting the resistance values of the resistive elements R. A problem of the Boltzmann's model is to find out a weight Wkl (conductance of a resistive coupling element located at k row and l column) which allows the neural network to realize by itself a probability distribution of input/output data as correctly as possible without the same being externally applied. To set the weight Wkl of each resistive element, there is provided a weight processor (not shown) for each weight Wkl. This weight processor has functions of latching weight data, shifting the latched data to an adjacent latch, and after each operation loop (plus phase, minus phase and the like), incrementing or decrementing the latched data according to a predetermined relational equation.

The algorithm of the Boltzmann's model includes operation 1 (plus phase), operation 2 (minus phase), operation 3 (change of the weight Wil) and operation 0 (learning of output layer).

The operation 1 includes steps of (1) annealing, (2) collecting data, and (3) determining P+. The step of annealing is no externally apply an analog noise signal whose amplitude decreases as the operation proceeds, to the differential inputs of each differential amplifier. That is, by starting this step of annealing at a high temperature and then gradually reducing the temperature, a neural network system is put in a thermal equilibrium, or have a global energy settled in local minima. This state appears at each differential amplifier Z, which evaluates its own state and sets it in the "on" or "off". The data collecting step is to determine the number of states where both two coupled neurons (differential amplifiers) take "1". The mean value of collected data in each data collecting step is represented by P+.

In the operation 2 (minus phase), the above-described three steps of the operation 1 are executed with only the states of those neuron (differential amplifiers) receiving input data being fixed at "1". In this operation 2, a value obtained in the step of finding a mean value is assumed to be P−.

The operation 3 is to change the weight Wkl according to the mean values P+ and P− obtained in the operations 1 and 2.

After the operations 1 and 2, the respective weights Wkl have been adjusted in parallel operation. The weight processors provided for the respective weights evaluate their states to increment or decrement the corresponding weights. As previously described, since the data input/output lines are arranged to form pairs, the weights are adjusted using the above-mentioned parallel algorithm.

In FIG. 7, there is shown an example of specific elements of a resistive element providing the weight Wkl. In FIG. 7, a weight portion comprises four transistor groups TR1, TR2, TR3 and TR4 for providing a positive or negative coupling. The transistor groups TR1 to TR4 are configured in the same manner and each comprises n MOS transistors T0 to Tn−1 and a pass-transistor TG.

The resistance ratios (width/length ratio of a transistor) of the MOS transistors T0 to Tn−1 are set to 1:2: . . . : $2^n - 1$. The pass-transistors TG are responsive to either of sign bits $T_{SGN}$ and $\overline{T_{SGN}}$ indicative of positive and negative couplings for connecting data input lines to corresponding data output lines. In this case, since transistor groups provided on a diagonal simultaneously connect the data input and output lines, the pass-transistors TG1 and TG4 receive the positive sign bit $T_{SGN}$ at their gates and the pass-transistors TG2 and TG3 receive the negative sign bit $\overline{T_{SGN}}$. The weight Wij provided by the resistive elements R can be set as desired by putting an appropriate combination of the transistors T0 to Tn−1 in each transistor group in the on state.

Such semiconductor neural networks according to the Hopfield's model and the Boltzmann's model, which have employed various types of structure to express the weight corresponding to synapse load, have the following problems.

When coupling elements, each configured of a basic cell having simple structure as shown in FIGS. 4 and 5, are provided at connections between data input lines and data output lines, each of the coupling elements can provide only three non-weighted states simply represented by "1", "0" and "−1", or correspondingly "excitatory state", "don't care state" and "inhibitory state". Therefore, the synapse coupling model is oversimplified so that in a practical circuit operation, convergence of the neural network to the energy of local minima is deteriorated.

To improve the convergence of the neural network, it is required to give multi-level expression to the coupling state (weight) of a coupling element. It has turned out through circuit simulations that in order to obtain a convergence generally fit for practical use, at least 10-bit (1024 steps) indication of the coupling state is required.

The multi-level expression of the coupling state can be implemented, for example, by the coupling element structure shown in FIG. 7. In the coupling element structure shown in FIG. 7, however, transistors of different conductances are required to constitute a single basic coupling element. Those different conductances can be obtained by adjusting size (ratio of gate width and length of a transistor, or the like) of those transistors. Therefore, it is required to provide a number of transistors of different sizes in a coupling element region. If the coupling element region is limited in area however, the size of the transistors is inevitably reduced and thus size differences between the transistors are also reduced. In this case, the size error or size error tolerance introduced inevitably in manufacturing the circuit has larger influences on the size differences between the transistors, so that a desired conductance ratio can not be given among the transistors. As a result, multi-valued weighting can not be precisely applied to each synapse coupling strength.

Similarly, when a number of neuron units are formed on a single semiconductor chip, the number of coupling elements is inevitably increased so that also the area occupied by a single coupling element formed on the limited semiconductor chip is reduced, bringing about the same problems as described above.

To obtain such coupling elements as can realize sufficient convergence, even if the number of transistors has been reduced by expressing weights using combinations of the transistors, a large number of transistors with well-controlled size accuracy are required. This has been an obstacle in reducing the occupied area of a coupling element and prevented formation of a high-density integrated neural network circuit on a limited semiconductor chip.

Further, instead of expressing a single weight using a plurality of transistors, a method of expressing multi-valued (more correctly, analogical) weight by using the charge amount accumulated at the floating gate of one non-volatile transistor has been proposed. When this floating gate-type transistor is used, however, since charge retention characteristics of the floating gate and correspondence between the accumulated charge amount and weighting factors still contain uncertainty, the weights (synapse loads) may possibly change in circuit operation, and the synapse coupling strengths may not obtain desired weights.

In this case, if the correspondence between the weighting factors and the accumulated charge amount, which is determined in the learning of the neural network, remains uncertain, it will bring about poor convergence in the learning, resulting in a longer learning time of the neural network.

SUMMARY OF THE INVENTION

An object of the present invention is to provide a neural network which can, with a small occupied area and a simple structure, certainly give multi-valued expression to weighting (weight) of a coupling strength provided by a coupling element, and an operating method thereof.

In a semiconductor neural network according to the present invention, data output lines are divided into a plurality of groups, in each of which signal potentials on the output lines are subject to predetermined weighting and the weighted output signals are added together for output.

The semiconductor neural network according to the present invention comprises a plurality of input lines each for transmitting an input data signal, a plurality of internal output lines provided in a direction intersecting with those plurality of input lines and divided into a plurality of groups, each for transmitting an internal output data signal, a plurality of coupling elements provided at the connections of the input lines and the internal output lines for coupling with specific coupling strengths the input lines to the corresponding internal output lines, and weighting addition means provided corresponding to each of the internal output line groups, for adding predetermined weights to signal potentials on the respective internal output lines in the corresponding internal output line group and adding all the weighted signal potentials together for output.

This weighting addition means preferably comprises a plurality of amplifying elements each having a control electrode coupled to a corresponding internal data output line one electrode coupled to a predetermined potential and the other electrode, whose current supply capability is given by a linear function of potentials on the control electrode and proportional to size of the element itself, and an amplifier for receiving in common outputs of the other electrodes of the plurality of amplifying elements to add them all together and amplifying the results.

Each of the plurality of coupling elements preferably includes storage elements for storing information expressive of its own coupling strength. Data retention capability of the storage elements is set according to a weight associated with an internal output line to which the coupling element is connected.

Each of the coupling elements is programmed to take any of "1", "0", and "−1", or any of the three states; "excitatory state" "don't care state" and "inhibitory state". This means that the coupling element couples with a non-weighted coupling strength a data input line to an internal data output line.

The weighting addition means adds predetermined weights to signal potentials on the data output lines in the corresponding group and then adds all the weighted signal potentials together for output. This weighting is multi-valued and preferably differs from one internal data output line to another. Consequently, this weighting addition means converts the non-weighted coupling states "1", "0" and "−1" into coupling states weighted to multiple levels and outputs signals corresponding to those multi-valued coupling states.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a waveform chart showing operation of the circuit shown in FIG. 11.

FIG. 15 is a timing chart of internal signals in a semiconductor neural network using the circuit of FIG. 14.

DESCRIPTION OF THE PREFERRED EMBODIMENTS

Figure 1:
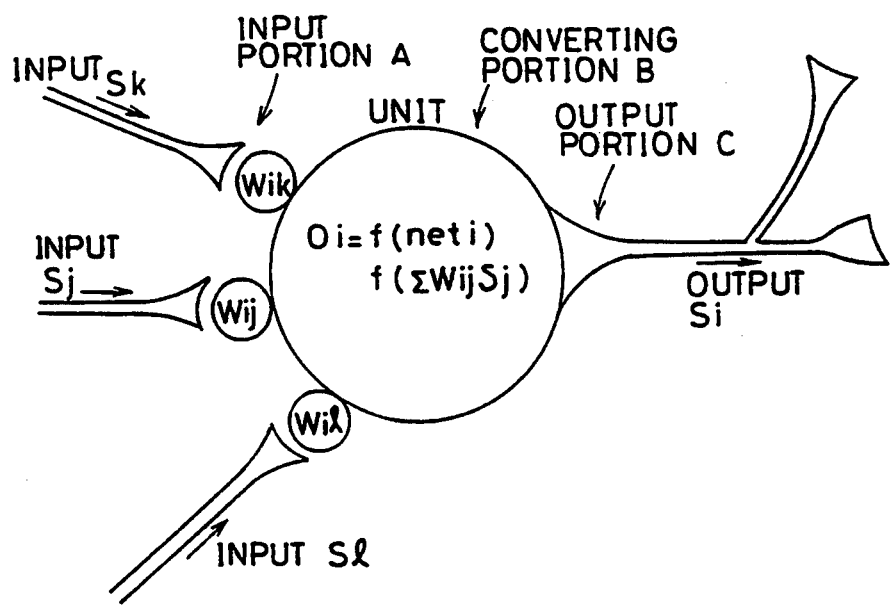
FIG. 1 is a diagram showing a conceptual neuron model.
Figure 2A:
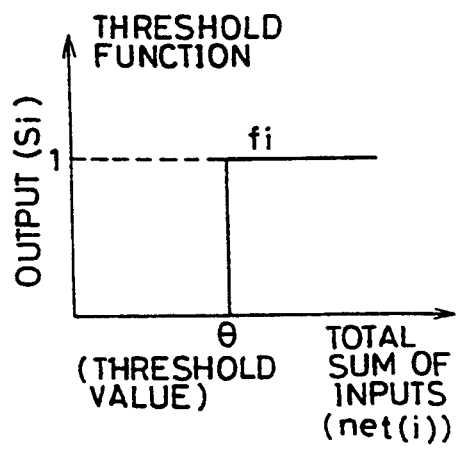
FIGS. 2A and 2B are diagrams showing examples of threshold function of a neuron.
Figure 2B:
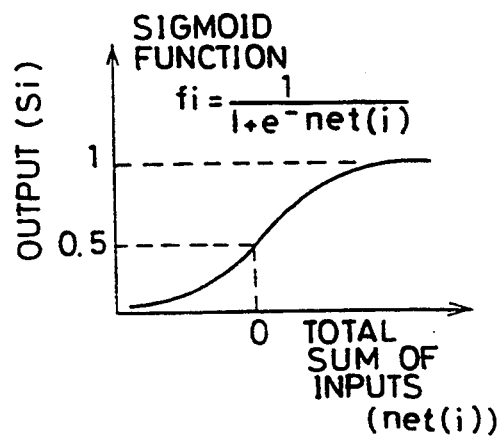
Figure 3:
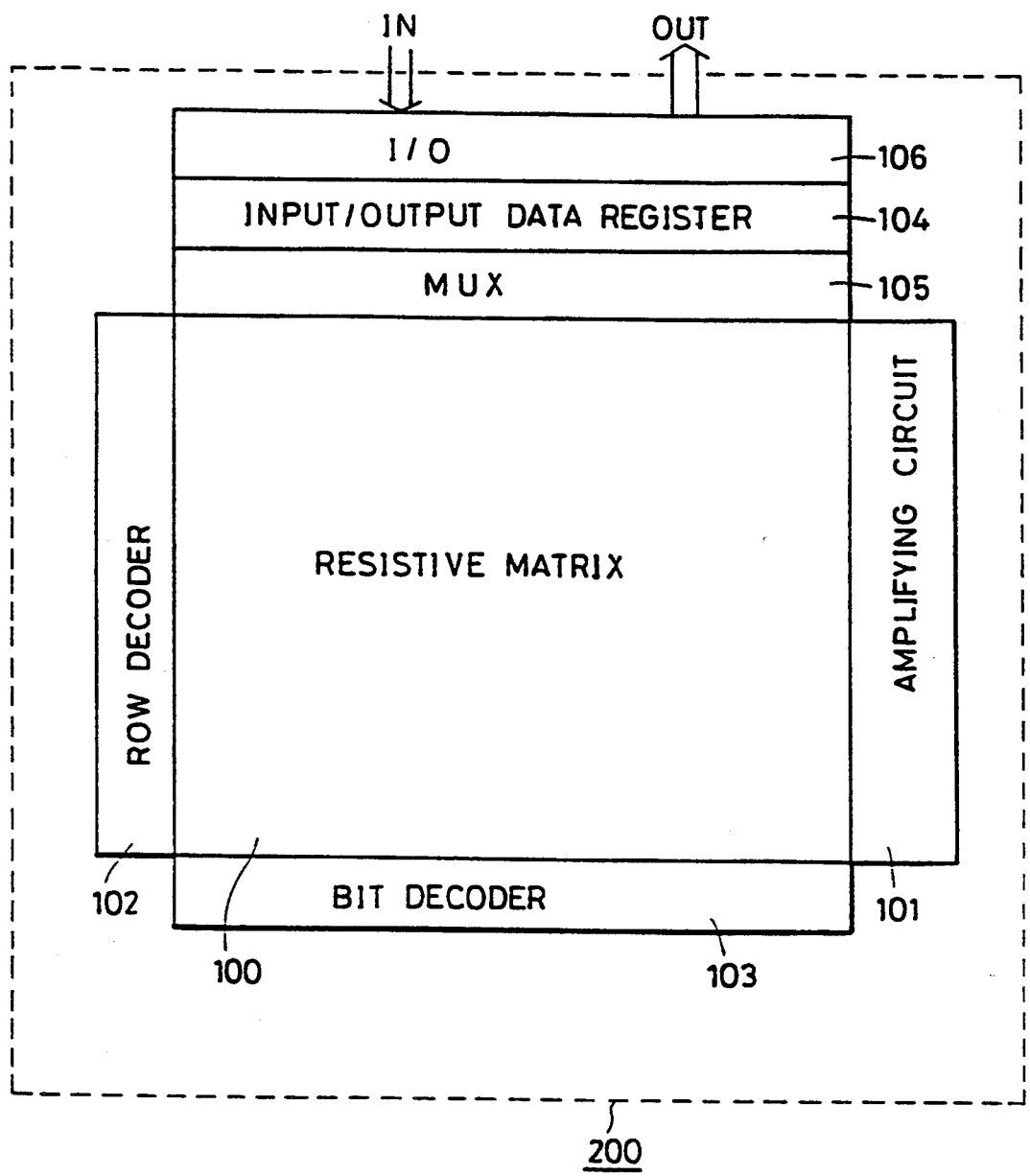
FIG. 3 is a schematic diagram showing the entire structure of a conventional semiconductor neural network.
Figure 4:
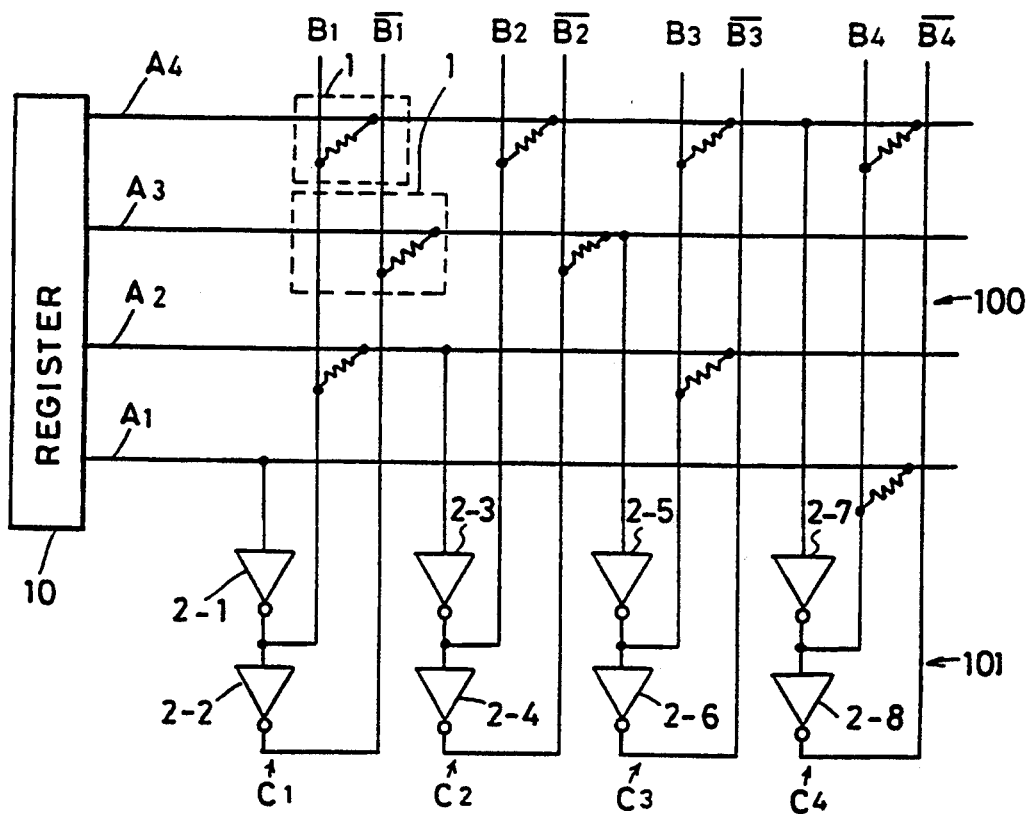
FIG. 4 is a schematic diagram showing structure of a conventional Hopfield-type neural network.
Figure 8:
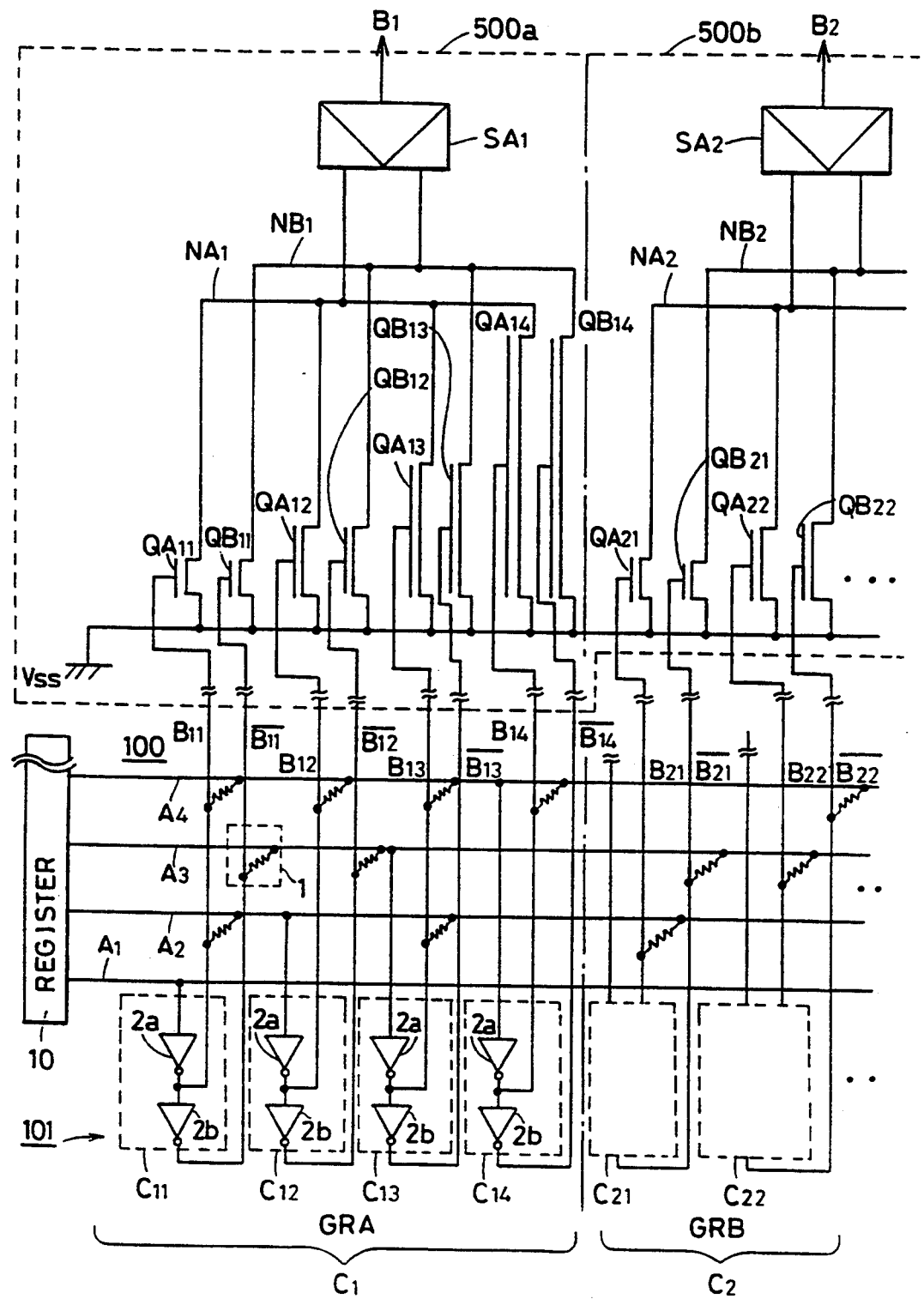
FIG. 8 is a diagram showing structure of the main part of a Hopfield-type semiconductor neural network according to an embodiment of the present invention.

In FIG. 8, there is shown a structure of the main part of a semiconductor neural network according to an embodiment of the present invention. The semiconductor neural network shown in FIG. 8 is of the Hopfield-type and has a structure corresponding to that of the conventional neural network shown in FIG. 4. If a noise generator is provided at the inputs of a sense amplifier SA shown in FIG. 8, a Boltzmann type neural network is implemented. The noise generator generates a noise with time-dependent attenuation to produce annealing process.

Referring to FIG. 8, feedback signal lines (corresponding to the data output lines in FIG. 4) for transmitting feedback signals to data input lines Ai (in FIG. 8, four data input lines A1 to A4 are typically shown) in a coupling matrix 100 are divided into a plurality of groups GRA, GRB, . . . . In FIG. 8, the feedback line group GRA and part of the feedback line group GRB are typically shown. The group GRA includes complementary feedback line pairs B11 and $\overline{B11}$, B12 and $\overline{B12}$, B13 and $\overline{B13}$ and B14 and $\overline{B14}$, and the group GRB includes complementary feedback lines B21 and $\overline{B21}$, B22 and $\overline{B22}$, . . . .

Amplifying circuits C11 to C14, and C21 and C22 are provided corresponding to the complementary feedback line pairs B11 and $\overline{B11}$ to B14 and $\overline{B14}$, and B21 and $\overline{B21}$, and B22 and $\overline{B22}$, respectively. Each of the amplifying circuits C11 to C14, and C11 and C22 is arranged to receive signal potential on the corresponding data input line as input, and transmits its outputs onto the corresponding complementary feedback line pair.

While in FIG. 8, the amplifying circuits C11 to C14 are shown as receiving signal potentials on the data input lines A1 to A4, respectively, and those data input lines to which input portions of the amplifying circuits C21, C22, . . . are coupled are not shown, other input data lines extend from a register 10 into the coupling matrix 100 to be coupled to the input portions of the respective amplifying circuits C21, C22, . . . . Those additional data input lines may be adapted to receive input data copied from the input data on the data input lines A1 to A4 or directly correspond to other input data, just as the data input lines A1 to A4, one to one. Further, the data input lines extending from the register 10 may be limited only to the four data input lines A1 to A4 and the respective amplifying circuits in each feedback line group may be adapted to receive signal potentials.

Each of the amplifying circuits C11 to C4, and C21 and C22 includes inverting amplifiers 2a and 2b connected in series over two stages. With this structure, complementary output signals are produced from each of the amplifying circuits C11 to C14, and C21 and C22, and transmitted onto a corresponding complementary feedback line pair.

Figure 5:
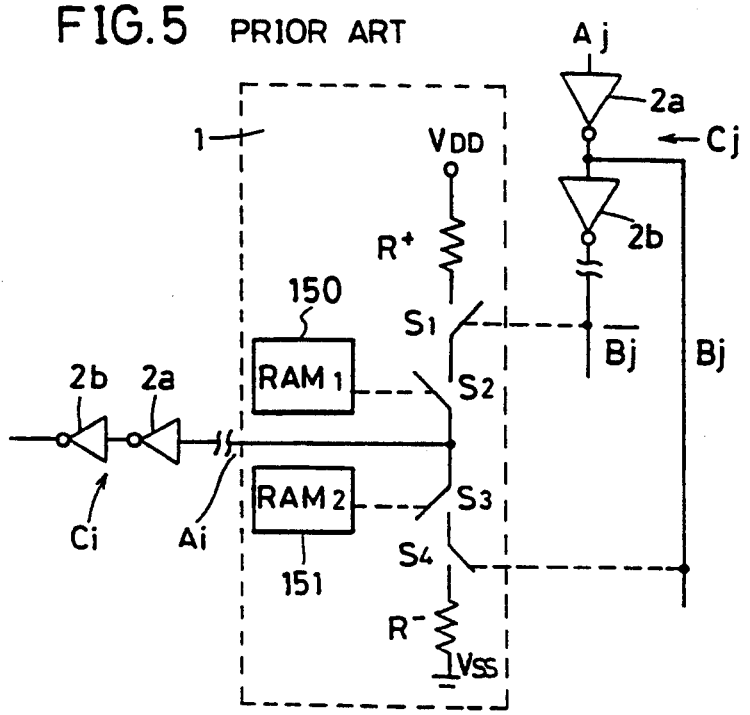
FIG. 5 is a schematic diagram showing a structure of the basic coupling element shown in FIG. 4.
Figure 6:
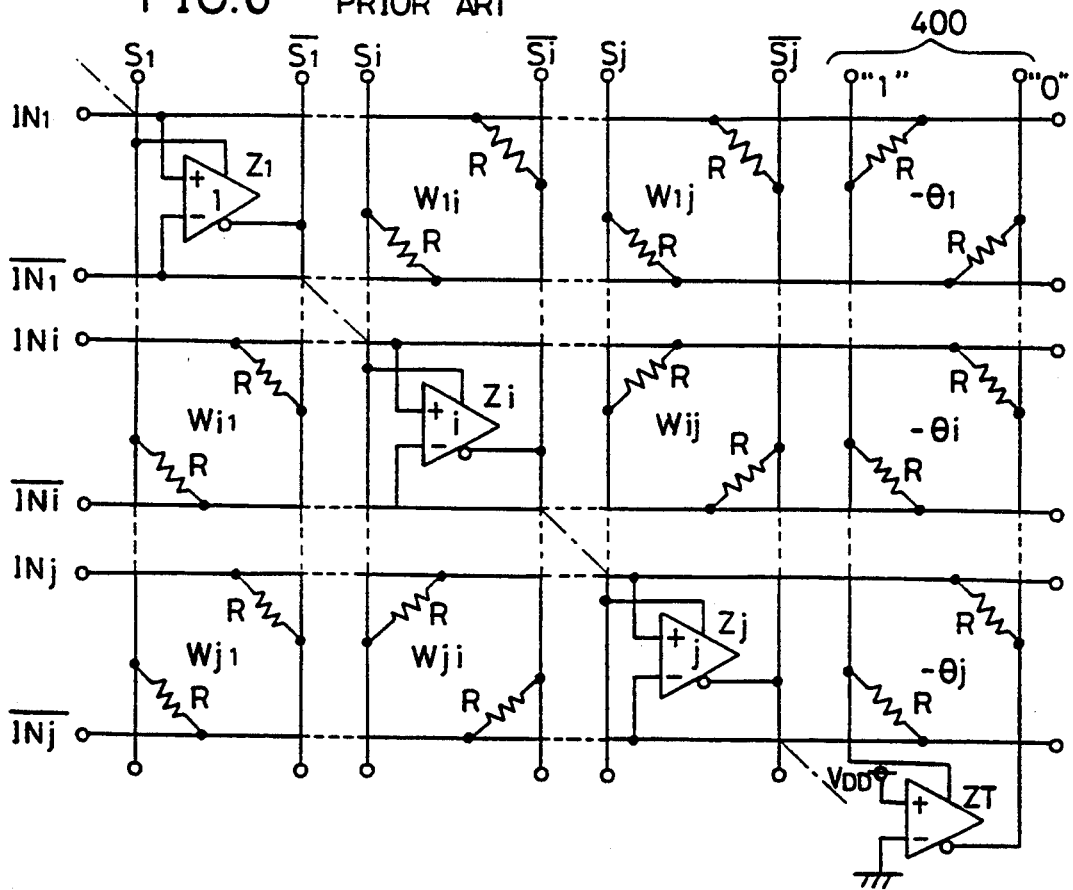
FIG. 6 is a schematic diagram showing structure of a conventional neural network according to the Boltzmann's model.
Figure 7:
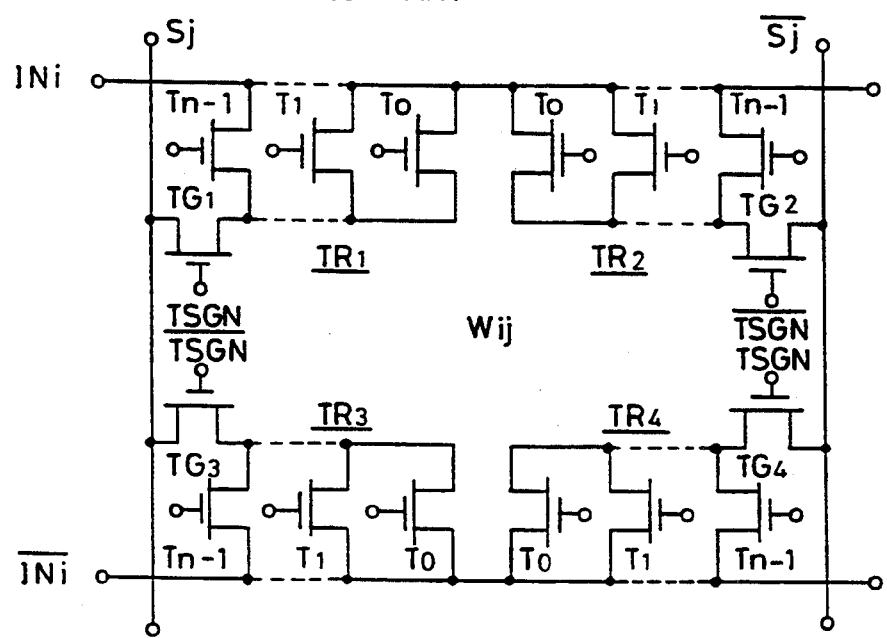
FIG. 7 is a diagram showing a structure of a basic coupling element in the circuit shogun in FIG. 6.

Coupling elements 1 are provided at connections between the data input lines and the feedback lines. A coupling element 1 has a structure as shown in FIG. 5 and can express any of the three states; "excitatory state," "don't care state" and "inhibitory state". In the following description it is assumed that a coupling strength provided by the coupling element 1 has not been weighted at all, and takes any value of "1", "0" and "−1", but can not take any intermediate value of those three values. In FIG. 8, a coupling element having the coupling strength of "0" is not shown in the matrix 100.

To give some weight to a non-weighted coupling strength, weighting current addition circuits 500a and 500b are provided corresponding to the feedback line groups GRA and GRB, respectively.

The weighting current addition circuit 500a comprises amplifying elements QA11 to QA14 provided corresponding to the feedback lines B11 to B14 for amplifying signal potentials on the corresponding feedback lines, amplifying elements QB11 to QB14 provided corresponding to the complementary feedback lines $\overline{B11}$ to $\overline{B14}$, respectively, for amplifying potentials on the corresponding complementary feedback lines, and a sense amplifier SA1 for differentially sensing and amplifying total sums of output currents of the amplifying elements QA11 to QA14 and of output currents of the amplifying elements QB11 to QB14.

The amplifying elements QA11 to QA14 are constituted of MIS (insulating gate-type) transistors which have been selected for their conductance values and element sizes to have an appropriate ratio such as 1:2:4: . . . :$2^N$ and are connected to the corresponding feedback lines at their gates. Each of the MIS transistors QA11 to QA14 has one electrode coupled to a predetermined potential $V_{SS}$ such as ground potential, the other electrode connected to a common node NA1, and its gate connected to the corresponding feedback line.

Each of the MIS transistors QB11 to QB14 has one electrode connected to the predetermined potential $V_{SS}$, the other electrode connected to a common node NB1, and its gate connected to the corresponding complementary feedback line.

The MIS transistors provided corresponding to a complementary feedback line pair are selected to be equal to each other in their size, current supply capability (driving capability) and amplification factor. In the example shown in FIG. 8, as reference numerals of the MIS transistors QA11 to QA14 and QB11 to QB14 become larger, their element size, current supply capability and conductance also become larger.

Similarly, the weighting current addition circuit 500b comprises amplifying elements QA21 and QA22 provided corresponding to the feedback lines B21 and B22, amplifying elements QB21 and QB22 provided corresponding to the complementary feedback lines $\overline{B21}$ and $\overline{B22}$, and a sense amplifier SA2 for differentially sensing and amplifying a total sum current of the amplifying elements QA21 and QA22 appearing on a node NA2 and a total sum current of the amplifying elements QB21 and QB22 appearing on another node NB2. Also in this weighting circuit addition circuit 500b, each amplifying element is constituted of an MIS transistor which amplifies, with an amplification factor corresponding to its element size, a potential received at its gate and transmits the amplified potential to the node NA2 or NB2.

Now, operation of the neural network will be briefly described below.

For simplicity, it is assumed that the weight to be provided by an MIS transistor serving as an amplifying element is determined by adjusting the transistor width. The drain current $I_{DS}$ of the MIS transistor is given by:

$$I_{DS} = u \cdot Cox \cdot (W/L) \cdot \left\{ (V_{GS} - V_T) \cdot V_{DS} - \frac{V_{DS}^2}{2} \right\}.$$

In the expression above, u represents electronic mobility, Cox thickness of the oxide film, W gate width of the transistor, L gate length of the transistor, $V_{GS}$ gate-source voltage of the transistor, $V_T$ threshold voltage of the transistor, and $V_{DS}$ drain-source voltage.

As will be understood from the expression, when the MIS transistor is run on the condition that the drain voltage $V_{DS}$ is substantially constant in a tripole region (which is not saturated with the drain current), the drain current $I_{DS}$ flows in proportion to the gate width (transistor width) W and in inverse proportion to the gate length L, representing a linear function of the gate potential $V_{GS}$. On the neural network semiconductor chip, the threshold voltage $V_T$ is considered to be the same. Therefore, when the gate widths W of amplifying elements QAi1 to QAiN (when a single feedback line group GRi includes N feedback lines) are designed to form a geometrical progression with 2 as common ratio, the drain current $I_D$ flowing into a node NAi will be given by a linear function of voltages obtained by adding weights to the respective voltages on the positive feedback lines. More specific description will be made taking the feedback line group GRA shown in FIG. 8 as an example. When it is assumed that the potentials on the positive feedback lines B11 to B14 are Vi (i=1 to 4) and the gate widths of the amplifying elements QA11 to W14 have a ratio of 1:2:4:8, the current $I_D$ flowing into the node NA1 is given by:

$$I_D = \sum_{i=1}^{4} X \cdot Wi \left\{ \left( Vi - V_T \cdot B - \frac{B^2}{2} \right) \right\} = K \cdot \sum_{i=1}^{4} Wi \cdot$$

$$Vi - M \left( \because \Sigma Wi = W \cdot \sum_{i=1}^{4} 2^{i-1} = \text{constant} \right)$$

In the expression above, the relation X=u. Cox/L stands, B is the drain-source potential $V_{DS}$, and further the following relation can be found.

$$K = X \cdot B, M = X \Sigma Wi \left( V_T \cdot B + \frac{B^2}{2} \right)$$

In the expression above, since K and M can be considered to be constants, the drain current $I_D$ appearing at the node NA1 will be given as a linear function of total sums of values obtained by multiplying the signal potentials on the feedback lines by the gate widths of the amplifying elements. At this time, the gate width Wi represents a weighting factor for the synapse coupling strength.

Also for the complementary feedback lines, when amplifying elements QBi1, QBi2, ... QBiN have their gate widths weighted and their drain electrodes connected together to a node NBi, then the drain current appearing at the node NBi will be given as a linear function of voltages obtained by adding the predetermined weights to the respective voltages on the complementary feedback lines.

Therefore, when the sense amplifier SA1 differentially senses and amplifies the currents flowing into the nodes NA1 and NB1 or voltages corresponding to those currents, potential of output signal B1 from the sense amplifier SA1 is given as:

$$B1 \alpha I_D - I_D' = K \sum_{i=1}^{4} Wi \cdot (Vi - Vi')$$

In the expression above, $I_D$ is the drain current at the node NA1 and $I_D'$ is the drain current at the node NB1. Furthermore, Vi represents potential on a positive feedback line and Vi' represents potential on a complementary feedback line. Therefore, the output signal B1 is provided as a total sum of values obtained by multiplying only those terms that are proportional to $V_{GS}$ among the output potentials on the respective four feedback signal line pairs by their corresponding weights $2^i$.

When compared with the conventional case, therefore, this operation corresponds to that of multiplying synapse input signals by weights indicative of coupling strengths and summing all the weighted input signals.

Even if a neural network employs the basic coupling matrix 100 having a number of basic coupling elements arranged therein, each of which has a simple structure and takes ternary state of "excitatory state", "inhibitory state" and "don't care state", the neural network can provide a synapse coupling matrix having desired coupling strengths programmed therein if only, as described above, weighting current addition circuits are provided outside of the coupling matrix 100 and amplifying elements loaded with predetermined weights are provided corresponding to the respective feedback lines.

While in the foregoing description, the weighting factor of an amplifying element is adjusted by the gate width of the transistor, the same effects as in the embodiment above can be obtained even if the weighting factor is determined by adjusting any of the combination of gate width and gate length, the gate length, and the element size.

In the structure described above, the weighting factors provided by the amplifying elements contained in the weighting current addition circuits are set to be constant. Coupling states expressed by the respective coupling elements in the coupling matrix are programmed to become optimal for the weighting factors of those amplifying elements in the learning of the neural network. This means that minutely multi-valued expression is given to the synapse coupling strength (weight) in the learning, speeding up convergence of the neural network to local minima of energy.

Meanwhile, in the structure described above, the number of feedback line groups is properly selected corresponding to the required bit number of an output signal and thus correspondence of the bit width between input data and output data is not necessarily required.

In FIG. 8, even if the transistors QA11 to QA14 and QB11 to QB14 are the same in size, multi-valued weighting can be implemented.

Figure 9:
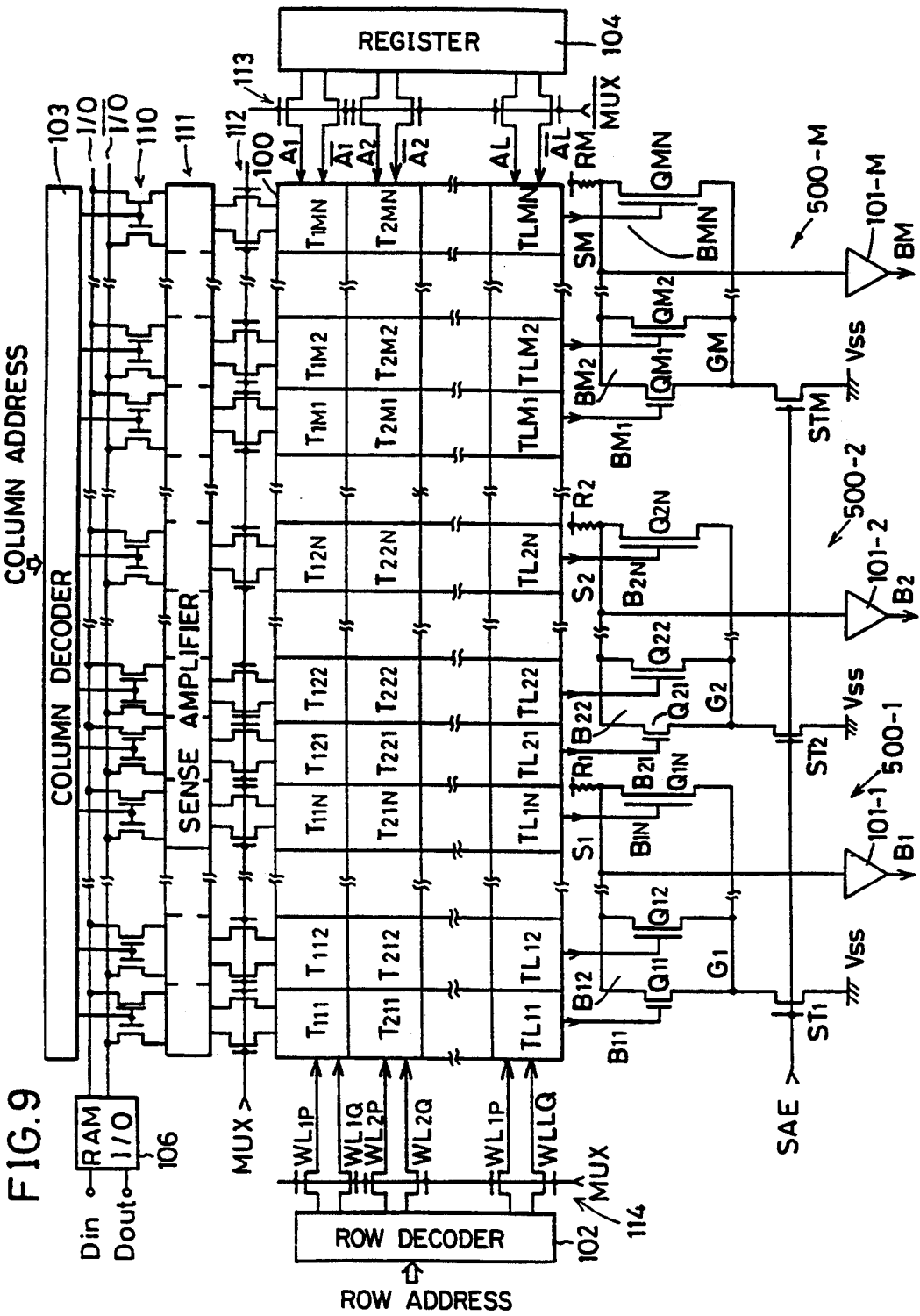
FIG. 9 is a diagram showing the entire structure of a semiconductor neural network according to another embodiment of the present invention.

In FIG. 9, there is shown a schematic diagram of the entire structure of a semiconductor neural network according to another embodiment of the present invention. In the neural network shown in FIG. 9, the element shown in FIG. 5 is used as a basic coupling element Tijk and the basic coupling elements constitute a non-Hopfield's type neural network having no interconnection. In this non-Hopfield's type neural network, outputs of amplifiers corresponding to neuron units are not fed back into the coupling matrix but simply signal potentials on the data input lines are transmitted onto internal data output lines through the coupling elements.

In the structure of basic coupling element shown in FIG. 5, complementary input data line pairs each for transmitting complementary input data are generally used, with the purposes of improving the conveyance and the like.

Referring to FIG. 9, the coupling matrix 100 in the semiconductor neural network has a plurality of coupling elements T111 to TLMN arranged in rows and columns. These coupling elements are divided into groups each including a plurality of columns and thus a coupling elements array of L rows and N columns constitute a single group.

Each of the coupling elements Tijk can express ternary state, as described above, and to indicate the coupling state, random access memories are provided as storage elements.

In order to write information indicative of the coupling states of the coupling elements into the RAMs, a row decoder 102, a column decoder 103, sense amplifiers 111 and selective gates 110 are provided in the same manner as in the conventional dynamic RAM access memory case. The row decoder 102 is responsive to an externally applied row address for selecting one row of the RAM cells. Since the coupling element Tijk comprises two RAM cells, the row decoder 102 provides 2L output signal lines including row select lines WL1P to WLLP for programming excitatory coupling states and row select lines WL1Q to WLLQ for programming inhibitory coupling states.

The column decoder 103 is responsive to an externally applied column address for selecting one column of RAM cells in the coupling matrix 100.

Each of the selective gates 110 is responsive to a column decode signal from the column decoder 103 for turning on a corresponding transfer gate pair to connect a sense amplifier to internal data input/output buses I/O and $\overline{I/O}$. The internal data input/output buses I/O and $\overline{I/O}$ receive program information through a RAM I/O 106. The reason why the data input/output buses I/O and $\overline{I/O}$ constitute a complementary pair and also the transfer gates of each selective gate 110 form a pair is that the RAM cells are arranged in the so-called folding bit-line structure or they are static-type memory cells. The sense amplifiers 111 are provided corresponding to the columns of the coupling matrix 100 and latch the program information written through the RAM I/O 106.

A register 104 is provided to transmit input data signals required in operation of the neural network to the coupling matrix 100. The register 104 has complementary data input lines A1 and $\overline{A1}$ to Al and $\overline{AL}$ as described above, through which desired input signals are transmitted into the matrix 100 of coupling elements.

Weighting current addition circuits 500-1, 500-2, . . . , 500-M are provided corresponding to the respective groups of the matrix of coupling elements.

The weighting current addition circuit 500-1, comprises MIS transistors Q11 to Q1N for receiving signal potentials on internal data output lines B11 to B1N at their respective gates, and an amplifier 101-1 for receiving and amplifying output currents of these MIS transistors Q11 to Q1N through a node S1 for output. The transistors Q11 to Q1N are provided in parallel between the node S1 and another node G1. The node G1 is connected to ground potential $V_{SS}$ through a sense amplifier activating transistor ST1 which is responsive to a sense amplifier activating signal SAE to be turned on. The node S1 is coupled to a predetermined high potential (for example, supply potential) through a pull-up register R1. This pull-up register R1 assures the high level at the node S1. The transistors Q11 to Q1N are properly adjusted in their size (area, gate width, gate length and the like) and thus have their predetermined weighting factors.

The weighting current addition circuit 500-2 is configured in the same manner and comprises transistors Q21, Q22, . . . Q2N serving as amplifying elements, a pull-up register R2, a sense amplifier activating transistor T2 and a sense amplifier 101-2. The transistors Q21 to Q2N are connected in parallel between a node S2 and another node G2. The transistors Q21 to Q2N receive signal potentials on the corresponding internal data output lines at their gates.

Also the weighting current addition circuit 500-M comprises transistors QM1, QM2, . . . QMN, a pull-up register RM, a sense amplifier activating transistor STM and a sense amplifier 101-M. The transistors QM1 to QMN are connected in parallel between a node SM and another node GM. The transistors QM1 to QMN receive potentials on the corresponding internal data lines at their gates. The node SM is coupled to a predetermined potential through the pull-up register RM.

The corresponding transistors Q1i, Q2i, . . . QMi in the respective weighting current addition circuits 500-1 to 500-M have the same size.

In this structure, inputs of the sense amplifiers 101-1 to 101-M are not differential signals since the internal data lines B11 to BiN do not take the structure of complementary data line pairs. However, even if the sense amplifiers 101-1 to 101-M are differential amplifiers in this case, appropriate adaptations can be made if only the reference potential of each amplifier is properly selected.

In order to program coupling states of the coupling matrix 100, there are provided transfer gates 112 responsive to a switching signal MUX for being turned on to connect the sense amplifiers 111 to the coupling matrix 100, second transfer gates 114 responsive to the switching signal MUX for being turned on to connect output of the row decoder 102 to the coupling matrix 100, and third transfer gates 113 responsive to a switching signal $\overline{MUX}$ for being turned on to connect output of the register 104 to the coupling matrix 100. In programming the coupling states of the coupling elements, the transfer gates 112 and 114 are turned on, while in a practical operation of the neural network, the transfer gates 113 are turned on. Subsequently, operation of the neural network will be briefly described.

Programming of the coupling state of each coupling element Tijk in the coupling matrix 100 is performed in the same manner as in the conventional DRAM case. That is, in the programming, according to the switching signals MUX and $\overline{MUX}$, the sense amplifiers 111 and the row decoder 102 are connected to the coupling matrix 100 through the transfer gates 112 and 114, and the register 104 is disconnected from the coupling matrix 100 by the transfer gates 113. At this time, the sense amplifier activating signal SAE is at the "L" level, or in the inactive state.

First, a row address is externally applied to the row decoder 102 so that one output line of the row decoder is selected and thus one row of RAM cells is selected. Subsequently, one column is selected by the column decoder 103 and then the transfer transistors of the selective gates 110 are turned on. By the time when these selective gates 110 are put in the on state, program information has been transmitted through the RAM I/O 106 to the internal data input/output buses I/O and $\overline{I/O}$. Signal potentials on the internal data input/output buses I/O and $\overline{I/O}$ are latched by the sense amplifiers 111 and then desired coupling information is written in the selected RAM cells. By performing this operation for each coupling element of the matrix 100, coupling states are programmed in the coupling matrix 100.

In practical operation of the neural network, the row decoder 102 and the sense amplifiers 111 are disconnected from the coupling matrix 100 in response to the switching signal MUX. On the other hand, the register 104 is connected to the coupling matrix 100 in response to the complementary switching signal $\overline{MUX}$. In this state, data from the register 104 is transmitted to signal lines A1 and $\overline{A1}$ to AL and $\overline{AL}$ for complementary input signal data and further transmitted into the coupling matrix 100. The respective coupling elements Tijk in the coupling matrix 100 transmit potentials on the input signal lines to the internal data lines B11 to B1N, ..., BM1 to BMN according to the programmed coupling states.

At a predetermined time, the sense amplifier activating signal SAE rises so that the sense amplifier activating transistors ST1, ST2 ..., STM are turned on, connecting the nodes G1, G2, ..., GM to the ground potential $V_{SS}$. As a result, potentials at the nodes S1, S2 ..., SM change according to the weighting factors of the respective amplifying elements Q11 to Q1N, Q21 to Q2N, and QM1 to QMN. The sense amplifiers 101-1 to 101-M sense and amplify the potential changes at the nodes S1 to SM, respectively, and output signals B1 to BM.

In the neural network configured as shown in FIG. 9, inputs of the sense amplifiers 101-1 to 101-M are not differential signals as in FIG. 8. However, when the reference potentials of the sense amplifiers 101 have been properly selected, potential changes which correspond to differences in number between those elements in the "excitatory state" and those in the "inhibitory state" among the basic coupling elements connected to the internal data output lines appear on the internal data output lines Bij. Since the potential changes on the internal data output lines are applied to the weighted gate electrodes of the transistors, at a node Si to which transistors Qij are coupled together at their drains, there appears a potential (or current) corresponding to a value obtained by multiplying the "excitatory state" data and the "inhibitory state" data by the coupling strengths provided by the respective amplifying elements and adding the multiplied values together, in the associated occupying element group. The sense amplifiers 101-1 to 101-M amplify those potentials (or currents) that have appeared at the nodes S1 to SM and output the results, respectively. When the reference potentials of the respective sense amplifiers 101-1 to 101-M have been properly selected, the sense amplifiers 101-1 to 101-M compare the reference potentials with the signal potentials having appeared at the respective nodes S1 to SM and differentially amplify the results for output.

Figure 10:
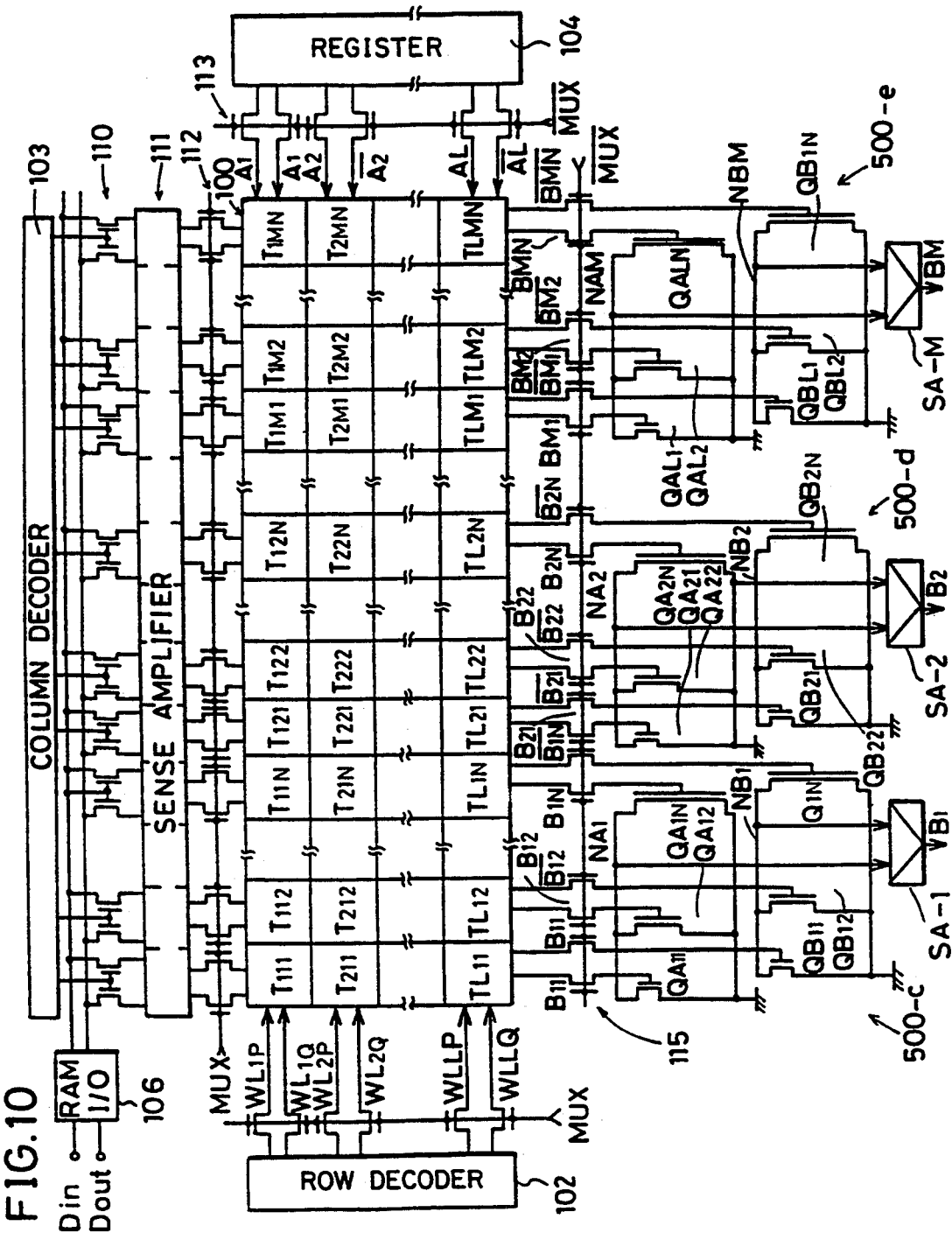
FIG. 10 is a diagram showing the entire structure of a semiconductor neural network according to still another embodiment of the present invention.

In FIG. 10, there is shown a schematic diagram of the entire structure of a semiconductor neural network according to still another embodiment of the present invention. In the structure shown in FIG. 10, the coupling matrix 100 outputs complementary neuron output signals. That is, internal data nines extending from this coupling matrix 100 form complementary signal line pairs B11 and $\overline{B11}$ to B1N and $\overline{B1N}$, B21 and $\overline{B21}$ to B2N and $\overline{B2N}$, and BM1 and $\overline{BM1}$ to BMn and $\overline{BMN}$.

Each of the weighting current addition circuits 500-c to 500-e differentially detects and amplifies currents at a node NAi where a total sum of outputs of the positive data lines appears and at another node NBi which receives a total sum of current outputs of the negative internal data lines.

The structure of neural network shown in FIG. 10 is the same as that shown in FIG. 8 except that no feedback line is provided to extend into the coupling matrix and it is of a non-Hopfield's type having no interconnection.

Each of the coupling elements Tijk is the same as that shown in FIG. 5. Therefore, the structure shown in FIG. 10 is the same as that of FIG. 8 except that no interconnection for feeding back signal potentials for the data input lines into the coupling matrix is provided and thus no amplifying circuit is provided.

In this structure, in order to ensure the production of complementary signals, an inverting amplifier circuit may be provided to one of every paired internal data output lines which inverts potential on the internal data line and transmits the result to the node NAi (or NBi).

Further, in order to disconnect the weighting current addition circuits 500 from the coupling matrix 100 in programming the coupling states of the coupling matrix, transfer gates 115 may be provided, as shown in FIG. 10, to be turned on in response to a complementary switching signal $\overline{MUX}$.

Meanwhile, a data latch for storing one-row data may be provided and program information may be written in one row of coupling elements at a time from this data latch.

In the structure shown in FIG. 10, since the sense amplifiers SA-1 to SA-M receive differential input signals, it becomes possible to perform more precisely products summing operation of the coupling strengths weighted with the "excitatory" state and the "inhibitory" state.

Meanwhile, in the weighting current addition circuits configured as shown in FIG. 10, there may be further provided pull-up resistors for applying high levels to the nodes NAi and NBi, respectively, as in the structure shown in FIG. 9, and transistors for controlling activation timings of the sense amplifiers.

Alternatively, the potential coupled to one terminal of each transistor for weighting may be set to operation supply potential $V_{CC}$.

In the structure shown in FIGS. 8 and 10, if the differential inputs received by the sense amplifiers in the weighting current addition circuits have been precharged to a predetermined potential and equalized, it becomes possible to perform more precise and fast differential sensing and amplification. A specific structure of such a weighting current addition circuit is shown in FIG. 11 in detail.

Figure 11:
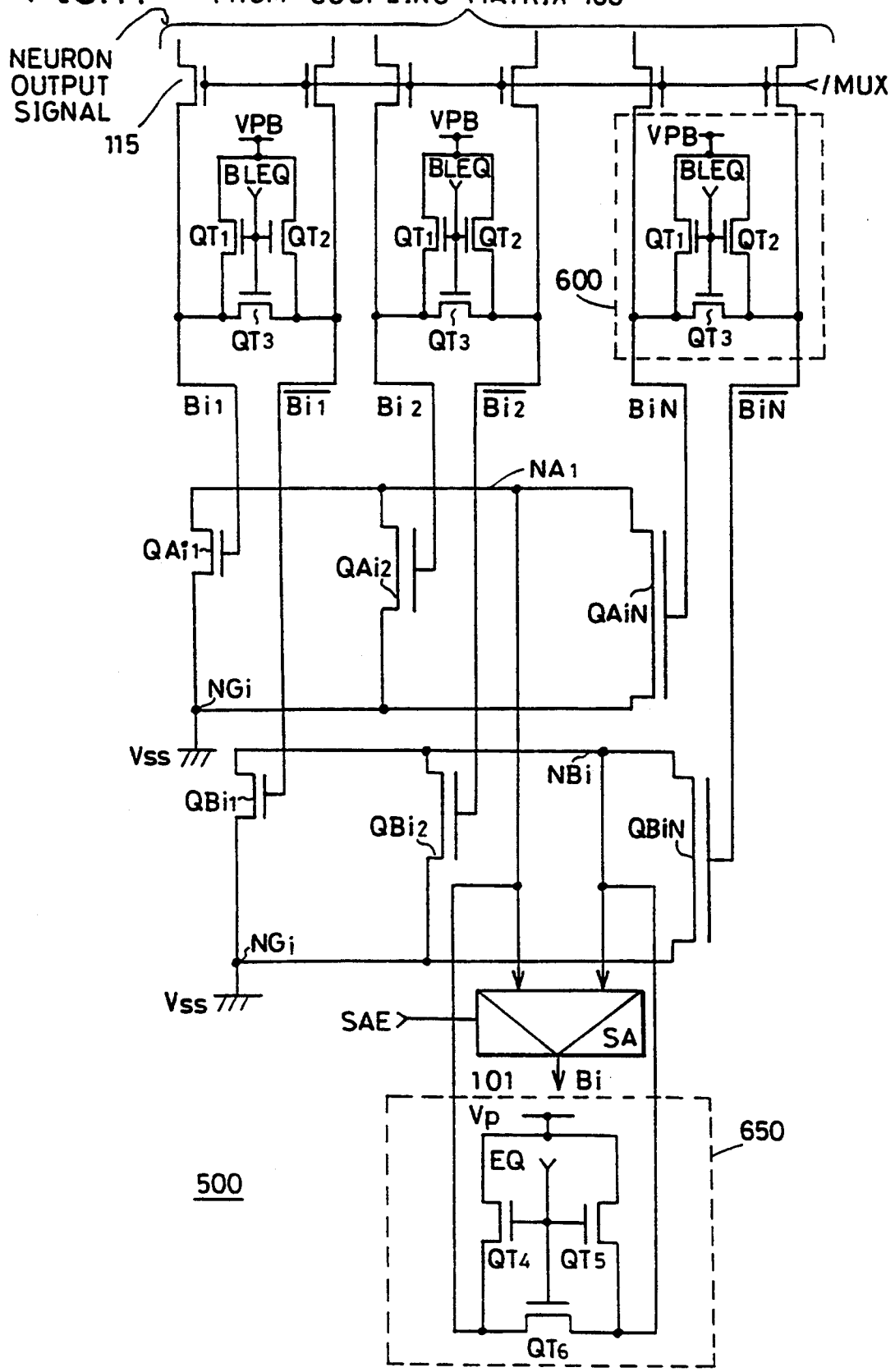
FIG. 11 is a diagram showing in detail an example of specific structure of a weighting current addition circuit.

In FIG. 11, a weighting current addition circuit 500 comprises, in addition to the structure shown in FIGS. 8 and 10, a first precharge/equalize circuit 600 for precharging potentials on complementary internal data lines Bij and $\overline{Bij}$ to a predetermined potential and equalizing them, and a second precharge/equalize circuit 650 for precharging potentials at the input nodes NAi and NBi of a sense amplifier 101 to a predetermined potential Vp and equalizing them.

The first precharge/equalize circuit 600 comprises a precharge transistor QT1 responsive to a precharge/equalize indicating signal BLEQ for being turned on to precharge the internal data output line to a predetermined potential $V_{PB}$, another precharge transistor QT2 responsive to the precharge/equalize signal BLEQ for being turned on to precharge the complementary internal data output line to the potential $V_{PB}$, an equalize transistor QT3 responsive to the precharge/equalize signal BLEQ for being turned on to electrically short-circuit the internal data output lines.

The second precharge/equalize circuit 650 comprises a precharge transistor QT4 for precharging the node NAi to the predetermined potential $V_P$, another precharge transistor QT5 for precharging the node NBi to the predetermined potential $V_P$ and an equalize transistor QT6 for electrically short-circuiting the nodes NAi and NBi and holding them at an equal potential. The transistors QT4, QT5 and QT6 are responsive to an equalization indicating signal EQ for being turned on.

Figure 12:
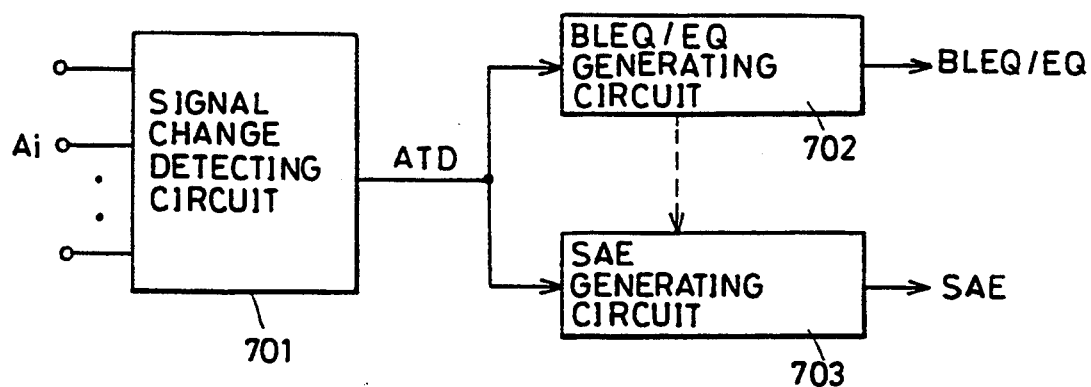
FIG. 12 is a diagram showing a circuit for generating control signals for the circuit shown in FIG. 11.

The circuit portion for loading output signals from the coupling matrix 100 with weights and adding the weighted signals together is configured in the same manner as in FIGS. 8 and 10 and thus transistors QAi1 to QAiN and QBi1 to QBiN that have been designed to have their own predetermined weights are provided corresponding to the positive internal data lines and the complementary internal data lines, respectively. In FIG. 12, there is shown an example of circuit structure for generating the precharge/equalize signal BLEQ/EQ.

Referring to FIG. 12, a precharge/equalize signal generating circuit comprises a signal change detecting circuit 701 for detecting a point of change of an input data signal Ai to produce an input change detecting signal ATD, a BLEQ/EQ generating circuit 702 responsive to the signal change detecting signal ATD for generating a one-shot pulse signal having a predetermined pulse width,, and a SAE generating circuit 703 responsive to the input change detecting signal ATD for generating a one-shot pulse having predetermined time intervals.

The input signal Ai applied to the signal change detecting circuit 701 may be either an external data signal applied to the register 104 (see FIG. 10) or an internal data signal produced by the register 104. When the register 104 has a buffering function, however, it is desirable for the signal change detecting circuit 701 to receive an external input data signal so that the input change detecting signal ATD can be produced at earliest possible timings.

The one-shot pulse signal generated from the BLEQ/EQ generating circuit 702 provides the precharge/equalize signal BLEQ/EQ. The one-shot pulse signal from the SAE generating circuit 703 serves as the sense amplifier activating signal SAE. In the following, operation of the circuit shown in FIG. 11 will be described with reference to an operational waveform chart shown in FIG. 13.

When the neural network operates, the transfer gates 115 are rendered conductive in response to the switching signals MUX and $\overline{MUX}$ to connect the weighting current addition circuit 500 to the coupling matrix 100. Subsequently, upon reception of the input data signal Ai (which may be either an external data signal or an internal data signal), a point of change of this input data signal is detected by the signal change detecting circuit 701 and the input change detecting signal ATD is outputted. The input change detecting signal ATD is a one-shot pulse signal having predetermined time intervals. In response to rise of this signal, the precharge/equalize signal BLEQ/EQ is generated. As a result, the precharge/equalize circuits 600 and 650 are activated so that the internal data line pairs and the nodes NAi and NBi are precharged to the predetermined potentials $V_{BP}$ and $V_P$, respectively, and then equalized.

When the precharge/equalize signal BLEQ/EQ falls, currents corresponding to the input data signal Ai applied to the coupling matrix 100 flow into the nodes NAi and NBi, causing potential changes at the respective nodes. After a subtle potential difference (current difference) has appeared across the nodes NAi and NBi, the sense amplifier activating signal SAE is generated, after a predetermined delay, in response to the fall of the precharge/equalize signal BLEQ/EQ so that the potential difference (current difference) of signals at the nodes NAi and NBi are differentially sensed and amplified. A thus differentially sensed and amplified signal Bi is outputted as output data signal.

When the application of the input data signal Ai is discontinued, the input change detecting signal ATD is generated again in response to the discontinuation. The sense amplifier activating signal SAE is put in the inactive state in response to rise of the detecting signal ATD. In this manner, one operation cycle of the neural network is completed.

As has been described above, by employing the structure where the internal data signal lines pairs and the differential input nodes NAi and NBi are first equalized using a one-shot pulse signal and then the subtle potential differences appearing across the differential input nodes due to subtle potentials appearing on the respective signal line pairs are sensed and amplified to output amplified output data, a circuit structure which can operate with high sensitivity and low consumption power and at a high speed can be obtained.

Meanwhile, in the circuit structure shown in FIGS. 12 and 13, the internal input data signal is generated corresponding to an external input data signal. In this case, according to time intervals at which the internal input data signal is applied, potentials on the internal data output line pairs and at the differential input nodes may have full swung.

Figure 14:
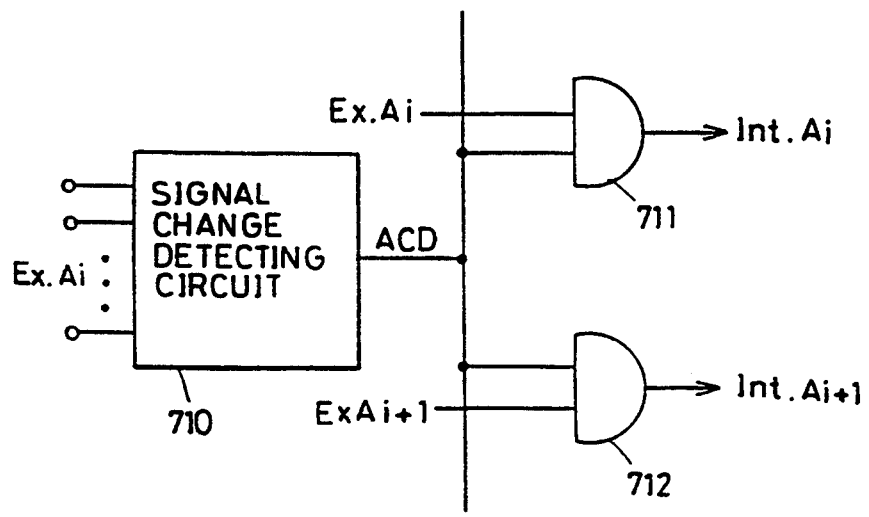
FIG. 14 is a schematic diagram showing a circuit structure for converting an internal data signal into a one-shot pulse.

In FIG. 14, there is shown a circuit structure for converting the internal input data signal into a one-shot pulse signal, which can prevent such full swing of potentials on the signal line pairs to achieve fast operability and low consumption power.

Referring to FIG. 14, a one-shotting circuit comprises a signal change detecting circuit 710 for detecting a point of change of external input data Ex. Ai to generate an input change detecting signal ACD, and gate circuits 711 and 712 responsive to the input change detecting signal ACD for being activated to allow passage of the external input data signal Ex. Ai and so forth. The one-shotting gate circuits 711 and 712 are provided each corresponding to an external input data signal and allow passage of the external input signal Ex. Ai and so forth in response to the one-shot input change detecting signal ACD to output a one-shot internal input data signal Int. Ai and so forth.

The one-shotting gate circuits 711, 712 and so forth correspond to the register 104 shown in FIG. 10.

When the input data signal is converted into a one-shot pulse signal using the one-shotting circuit shown in FIG. 14, the time periods for which the input data signal is applied become short so that the changes of signal potentials appearing on the signal line pairs do not make full swing, as shown in FIG. 15. Since the sensing and amplifying operation is performed with no full swing being made, fast operability and low consumption power can be achieved.

In FIG. 15, there is shown the potential changes on the signal line pair of Bij and $\overline{Bij}$ making no full swing. If the time periods for which the sense amplifiers 101 (SA) are activated are reduced correspondingly, also the potential changes at the nodes NAi and NBi do not make full swing any more so that fast operability and low consumption power can be achieved also in data reading.

Furthermore, the equalize/precharge signal BLEQ-/EQ and the sense amplifier activating signal SAE may be outputted when a point of change of this one-shot internal data signal Int. Ai is detected, or they may be generated in response to the input change detecting signal ACD.

Though specific structure of the signal change detecting circuits 701 and 710 shown in FIGS. 12 and 14 are not detailed here, they can be generally implemented using the same structure as that of an address change detecting circuit for generating internal operation timing signals in a random access memory among conventional semiconductor memory devices.

Figure 16:
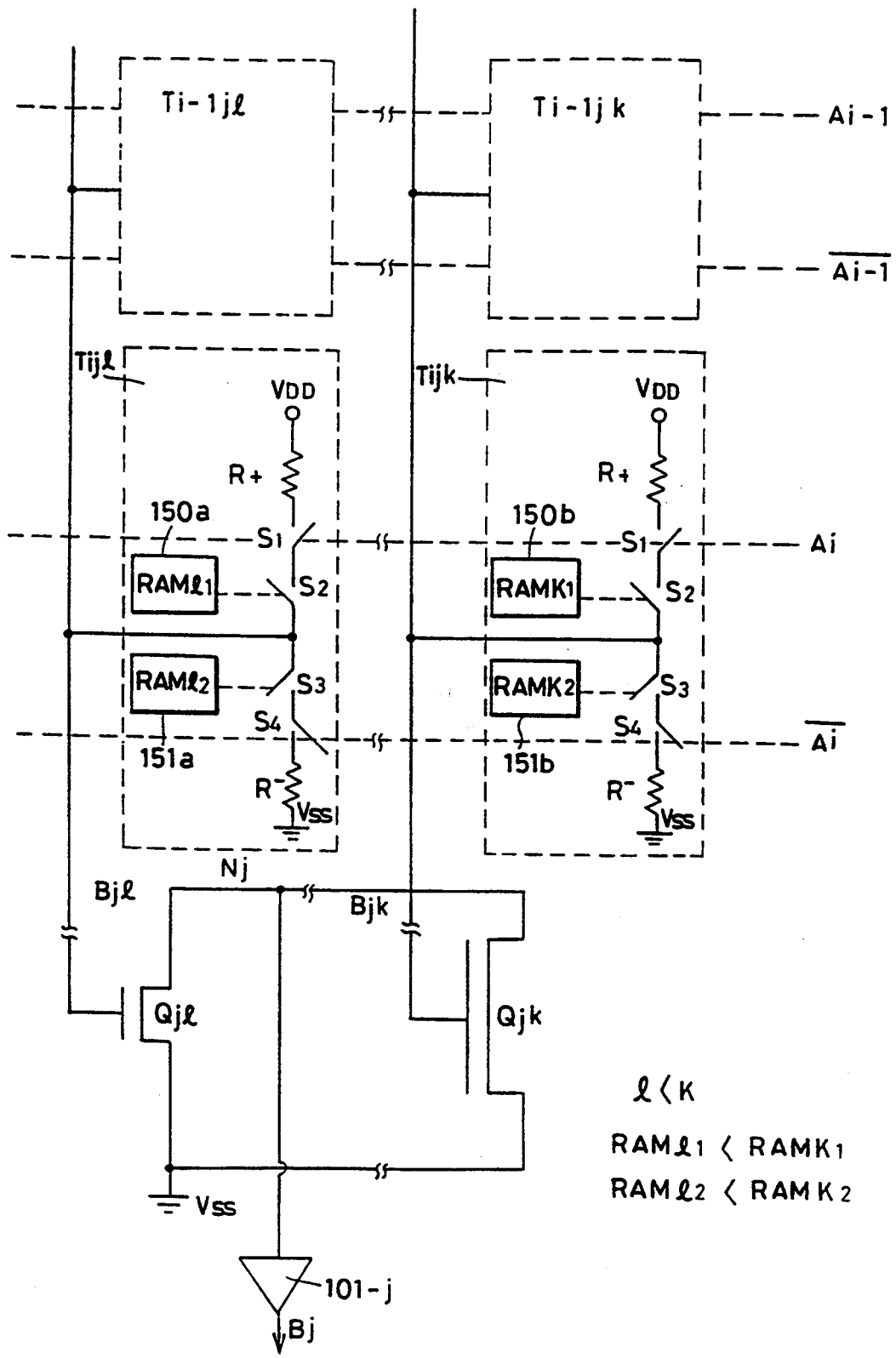
FIG. 16 is a diagram showing an example of structure of a coupling element in a semiconductor neural network according to another embodiment of the present invention.

FIG. 16 is a diagram showing the main structure of a semiconductor neural network according to still another embodiment of the present invention. In FIG. 16, there is shown an example of structure of coupling elements Tijl and Tijk. The structure of coupling elements of FIG. 16 corresponds to that of the conventional coupling elements shown in FIG. 5. However, these coupling elements are not limited to that structure only but may be configured such that coupling strength information of a coupling element is stored in storage elements contained therein and product of an input signal and a synapse coupling strength is made according the stored information.

The coupling element Tij1 comprises storage elements 150a and 151a constituted of random access memories for storing coupling strength information. Switching elements S2 and S3 are set in the conductive or non-conductive state according to the information stored in the storage elements 150a and 151a. Switching elements S1 and S4 receive input signals Ai and $\overline{Ai}$, respectively.

Similarly, the coupling element Tijk comprises storage elements 150b and 151b. Output signal of the coupling element Tij1 is transmitted to an internal output line Bj1 and output signal of the coupling element Tijk is transmitted to another internal output line Bjk. The internal output line Bj1 is connected to the gate of a transistor Qj1. The internal output line Bjk is connected to another transistor Qjk. The transistor Qj1 is set to have a smaller conductance than the transistor Qjk. That is, weighting associated with the internal output line Bjk is set larger than that of the internal output line Bj1.

Each of the transistors Qj1 and QJk has one conductive terminal connected to the input portion of an amplifying circuit 101-j through a node Nj. This amplifying circuit 101-j produces an output signal Bj. Further, this amplifying circuit 101-j performs threshold processing on current or a voltage signal appearing at the node Nj using its input logic threshold value and then amplifies the result for output. For these coupling elements Tij1 and Tijk, the subscript i corresponds to the number of the input signal applied to the neural network and the subscript j to the number of the output signal Bj. Further, the subscripts k and l correspond to magnitude of the weightings associated with the respective coupling elements, for example, to the weights $2^k$ and $2^l$, respectively.

The information retention capability of the storage elements 150b and 151b of the coupling element Tijk which provides a larger weighting for the coupling strength is made larger than that of the storage elements 150a and 151a in the coupling element Tij1. The information retention capability is adjusted by increasing size of the storage elements or size of only those parts of the storage elements which are associated with information retaining portions. The retention capability of the storage elements is given as a certain function of weightings provided by an internal output line associated with the storage elements, which may be a linear function or a non-linear function.

Generally, therefore, the information retention capability of the storage elements 150 and 151 (RAMk1 and RAMk2) of a coupling element with a subscript k in a matrix (Tik1) of coupling elements is set larger according as the number of the subscript k increase.

This semiconductor neural network operates in the same manner as the above-described embodiment. Generally, the miniaturization of semiconductor integrated circuits entails a reduction in size of storage elements contained therein so that their data retention characteristics are degraded under the influences of electrical noise, ionizing radiation and the like, as has been known.

As the weight associated with an internal output line gets greater, the internal output line makes a larger contribution to the processing results. By setting the information retention capability of the coupling strength information storage elements according to the degree of contribution which the respective coupling elements make to the signal processings, malfunction of the neural network caused by inverted storage information due to electric noise, ionizing radiation and the like can be prevented. Various methods have been investigated in the technology of semiconductor integrated circuit elements which can ensure operation margin represented by the data retention characteristics of storage elements while enjoying advantages of the miniaturization such as fast operability, high performance due to multi-function, the malfunction due to high density, low prices, high production yields and the like. It has been assumed that due to the operation principles, semiconductor neural networks have basically high stability against malfunction caused by partial destabilization of coupling elements. When the storage information of a coupling element providing a large weighting to the coupling strength (a coupling element with a large subscript k) is inverted, however, malfunction crucial to operation of the neural network may be caused since the coupling element makes a large contribution to the processings. This is analogous to the case with the vital brain, where when some damages are done, the functional recovery of a brain depends on the damaged portions even if the damages are of the same degree. For example, damaged functions may not be almost eternally recovered if important portions such as brain stem have been damaged.

In such a neural network, coupling elements connected to an internal output line with a large weighting can be considered to have important functions, in the processings. Therefore, it is desirable to assure those coupling elements of information retention characteristics and operation stability as well as to prevent soft errors such as inversion of storage information in the coupling elements. In this manner, operation stability of a neural network which can give, with a small occupied area and simple structure, multi-valued expression to the weighting of coupling strengths provided by coupling elements can be more certainly assured.

As has been described in the foregoing, according to the present invention, multi-valued expression of synapse coupling strength is realized by the weighting addition circuits provided outside of the matrix of coupling elements, so that a compact and high-capacity semiconductor neural network can be obtained which can employ coupling elements of simple structure and realize a high-density coupling matrix.

Further, since the weighting addition circuits have been adapted to provide predetermined weights according to size (gate length, gate width and the like) of the transistors, only a single transistor may be provided corresponding to one internal data output line, occupying a sufficient area for itself. Accordingly, weighting addition circuits which can, with simple structure and small occupied area, precisely add predetermined weights can be implemented without increasing the occupied area on a neural network chip.

Additionally, since the data retention characteristics and operation stability of storage elements contained in the coupling elements associated with an internal output line providing a large weighting are reinforced through their size adjustment and the like, a semiconductor neural network which has a minimum occupied area and a higher operation stability can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of weighting internal output lines of a semiconductor neural network including:
   a plurality of input lines each for transmitting a data signal to be processed;
   a plurality of internal output lines provided in a direction intersecting said plurality of input lines and divided into a plurality of groups, each group including a plurality of internal output lines and transmitting an internal output data signal; and
   a plurality of coupling elements provided at the intersections of said plurality of input lines and said plurality of internal output lines each for coupling, with a specific coupling strength, an input line with a corresponding internal output line and transmitting signals between said input line and said corresponding internal output line,
   said method comprising, in each group of said plurality of internal output lines, the steps of:
   loading a signal on each of said plurality of internal output lines with a previously selected weight to produce weighted signals;
   adding all of said weighted signals together to produce an output signal, said step of adding including the steps of
      coupling all of said weighted signals to a first node for each of said groups to provide a summation signal, and
      amplifying said summation signal at said first node for output; detecting transition of incoming input data; and
   in response to said detected transition, establishing a predetermined first potential at said first node for a predetermined period.

2. A method of weighting internal output lines of a semiconductor neural network including:
   a plurality of input lines each for transmitting a data signal to be processed;
   a plurality of internal output lines provided in a direction intersecting said plurality of input lines and divided into a plurality of group said plurality of internal output lines being arranged to form pairs in each group with each group including a plurality of internal output lines and transmitting an internal output data signal; and
   a plurality of coupling elements provided at the intersections of said plurality of input lines and said plurality of internal output lines each for coupling, with a specific coupling strength, an input line with a corresponding internal output line and transmitting signals between said input line and said corresponding internal output line, said method comprising in each group of said plurality of internal output lines, after a step of coupling, with a specific coupling strength, an input line to a corresponding internal output line and transmitting signals between said input line and said corresponding output line, the steps of:

loading a signal on each of said plurality of internal output lines with a previously selected weight to produce weighted signals;

adding all of said weighted signals on said plurality of internal output lines together to produce an output signal, said step of adding for each group including the steps of transmitting said weighted signal from the other internal output line of each pair to a second node to provide a second summation signal, and differentially amplifying said first and second summation signals on said first and second nodes; detecting transition of incoming input data;

in response to said detecting transition, equalizing potentials at each pair for a predetermined period; and in response to said detecting transition, enabling said differential amplification after said equalization is completed.

3. A method of weighting internal output lines of a semiconductor neural network including:

a plurality of input lines each for transmitting a data signal to be processed;

a plurality of internal output lines provided in a direction intersecting said plurality of input lines and divided into a plurality of groups, said plurality of internal output lines being arranged to form pairs in each group with each group including a plurality of internal output lines and transmitting an internal output data signal; and a plurality of coupling elements provided at the intersections of said plurality of input lines and said plurality of internal output lines each for coupling, with a specific coupling strength, an input line with a corresponding internal output line and transmitting signals between said input line and said corresponding internal output line, said method comprising, in each group of said plurality of internal output lines, after a step of coupling, with a specific coupling strength, an input line to a corresponding internal output line and transmitting signals between said input line and said corresponding output line, the steps of:

loading a signal on each of said plurality of internal output lines with a previously selected weight to produce weighted signals;

adding all of said weighted signals on said plurality of internal output lines together to produce an output signal, said step of adding for each group including the steps of transmitting said weighted signal from the other internal output line of each pair to a second node to provide a second summation signal, and differentially amplifying said first and second summation signals on said first and second nodes; detecting transition of incoming input data; and in response to said detecting transition, precharging each internal output line to a predetermined first potential for a predetermined period.

4. A method of weighting internal output lines of a semiconductor neural network including:

a plurality of input lines each for transmitting a data signal to be processed;

a plurality of internal output lines provided in a direction intersecting said plurality of input lines and divided into a plurality of groups, said plurality of internal output lines being arranged to form pairs in each group each group including a plurality of internal output lines and transmitting an internal output data signal; and a plurality of coupling elements provided at the intersections of said plurality of input lines and said plurality of internal output lines each for coupling, with a specific coupling strength, an input line with a corresponding internal output line and transmitting signals between said input line and said corresponding internal output line, said method comprising, in each group of said plurality of internal output lines, after a step of coupling, with a specific coupling strength, an input line to a corresponding internal output line and transmitting signals between said input line and said corresponding output line, the steps of:

loading a signal on each of said plurality of internal output lines with a previously selected weight to produce weighted signals;

adding all of said weighted signals on said plurality of internal output lines together to produce an output signal, said step of adding for each group including the steps of transmitting said weighted signal from the other internal output line of each pair to a second node to provide a second summation signal, and differentially amplifying said first and second summation signals on said first and second nodes; detecting transition of incoming input data;

in response to said detecting transition, precharging said first and second nodes to a first potential for a predetermined period; and enabling said differentially amplifying after said precharging for said predetermined period is completed.

5. A method of weighting internal output lines of a semiconductor neural network including:

a plurality of input lines each for transmitting a data signal to be processed;

a plurality of internal output lines provided in a direction intersecting said plurality of input lines and divided into a plurality of groups, each group including a plurality of internal output lines and transmitting an internal output data signal; and a plurality of coupling elements provided at the intersections of said plurality of input lines and said plurality of internal output lines each for coupling, with a specific coupling strength, an input line with a corresponding internal output line and transmitting signals between said input line and said corresponding internal output line, said method comprising, in each group of said plurality of internal output lines, the steps of:

loading a signal on each of said plurality of internal output lines with a previously selected weight to produce weighted signals;

adding all of said weighted signals together to produce an output signal, detecting transition of incoming input data;

in response to an output signal of detecting means, generating a one-shot pulse signal having a predetermined short time interval;

in response to said generated one-shot pulse signal, gating said incoming input data and transmitting the gated data to said plurality of internal input lines as said data signal to be processed.

* * * * *